United States Patent

Scott

(10) Patent No.: US 10,444,000 B2
(45) Date of Patent: Oct. 15, 2019

(54) SURFACE MEASUREMENT INSTRUMENT AND METHOD

(75) Inventor: Paul James Scott, Leicester (GB)

(73) Assignee: TAYLOR HOBSON LIMITED, Leicester, Leicestershire (GB)

(*) Notice: Subject to any disclaimer, the term of this patent is extended or adjusted under 35 U.S.C. 154(b) by 1256 days.

(21) Appl. No.: 13/504,214

(22) PCT Filed: Nov. 1, 2010

(86) PCT No.: PCT/GB2010/051829
§ 371 (c)(1),
(2), (4) Date: Jul. 9, 2012

(87) PCT Pub. No.: WO2011/051732
PCT Pub. Date: May 5, 2011

(65) Prior Publication Data
US 2012/0278035 A1    Nov. 1, 2012

(30) Foreign Application Priority Data

Oct. 30, 2009  (GB) .................................. 0919069.5
Jan. 28, 2010  (GB) .................................. 1001398.5

(51) Int. Cl.
*G01B 5/28* (2006.01)
*G01B 5/20* (2006.01)
*G01M 11/02* (2006.01)

(52) U.S. Cl.
CPC ............ *G01B 5/20* (2013.01); *G01M 11/025* (2013.01)

(58) Field of Classification Search
CPC .................................................... G01B 5/20
See application file for complete search history.

(56) References Cited

U.S. PATENT DOCUMENTS

| 4,884,697 A | * 12/1989 | Takacs ................. G01B 11/306 356/516 |
| 5,304,924 A | 4/1994 | Yamano et al. |
| 5,517,307 A | 5/1996 | Buehring et al. |
| 5,844,670 A | 12/1998 | Morita et al. |

(Continued)

FOREIGN PATENT DOCUMENTS

| EP | 0905531 | 3/1999 |
| EP | 1742018 | 1/2007 |

(Continued)

OTHER PUBLICATIONS

International Search Report for International Appln. No. PCT/GB2010/051829, dated Feb. 15, 2011.

(Continued)

*Primary Examiner* — Hyun D Park
(74) *Attorney, Agent, or Firm* — Tarolli, Sundheim, Covell & Tummino LLP

(57) ABSTRACT

A method of characterizing the surface of an aspheric diffractive structure includes using a metrological apparatus to perform a measurement on the surface of the structure so as to provide a measurement profile representing the z-direction deviations of the surface of the structure; determining parameters relating to the aspheric and diffractive components of the aspheric diffractive structure; producing data having the determined parameters; and comparing the produced data with the measurement profile to determine residual error data.

37 Claims, 20 Drawing Sheets

(56) References Cited

U.S. PATENT DOCUMENTS

| | | | | |
|---|---|---|---|---|
| 5,926,781 | A * | 7/1999 | Scott | G01B 21/20 |
| | | | | 33/503 |
| 6,327,788 | B1 * | 12/2001 | Seddon | G01B 5/201 |
| | | | | 33/543 |
| 6,344,656 | B1 * | 2/2002 | Hopkins | G01B 11/005 |
| | | | | 250/559.22 |
| 2002/0158636 | A1 * | 10/2002 | Tyan | G06T 7/0006 |
| | | | | 324/500 |
| 2006/0018514 | A1 * | 1/2006 | Bankhead | G01B 11/303 |
| | | | | 382/108 |
| 2006/0221350 | A1 * | 10/2006 | Murphy | G01J 9/02 |
| | | | | 356/614 |
| 2008/0234963 | A1 * | 9/2008 | Scott | G01B 21/042 |
| | | | | 702/86 |
| 2009/0060323 | A1 * | 3/2009 | Aragaki | G06K 9/40 |
| | | | | 382/164 |
| 2009/0254305 | A1 | 10/2009 | Koizumi | |
| 2012/0229814 | A1 * | 9/2012 | Freimann | G01B 11/2441 |
| | | | | 356/512 |

FOREIGN PATENT DOCUMENTS

| | | |
|---|---|---|
| EP | 1840504 | 10/2007 |
| GB | 2189604 | 10/1987 |
| GB | 2385417 | 8/2003 |
| GB | 2395777 | 6/2004 |
| GB | 2401937 | 11/2004 |
| GB | 2404014 | 1/2005 |
| GB | 2421302 | 6/2006 |
| JP | 2000-161933 | 6/2000 |
| WO | WO 2003/078925 | 9/2003 |
| WO | WO 2005/093368 | 10/2005 |
| WO | WO 2006/082368 | 8/2006 |
| WO | WO 2010/043906 | 4/2010 |

OTHER PUBLICATIONS

Written Opinion for International Appln. No. PCT/GB2010/051829, dated Feb. 15, 2011.

GB Search Report for GB Application No. GB0919069.5, dated Dec. 23, 2009.

GB Search Report for GB Application No. GB1001398.5, dated Mar. 15, 2010.

European Communication for European Application No. 10779030.5, dated Mar. 22, 2016, 4 pages.

* cited by examiner

Position in measurement array

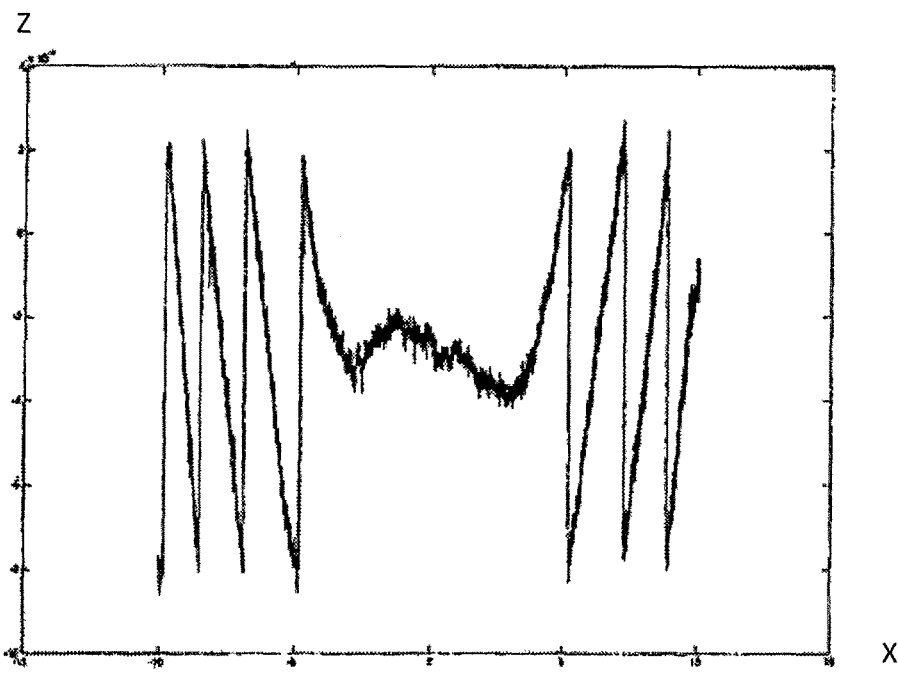
Fig. 24
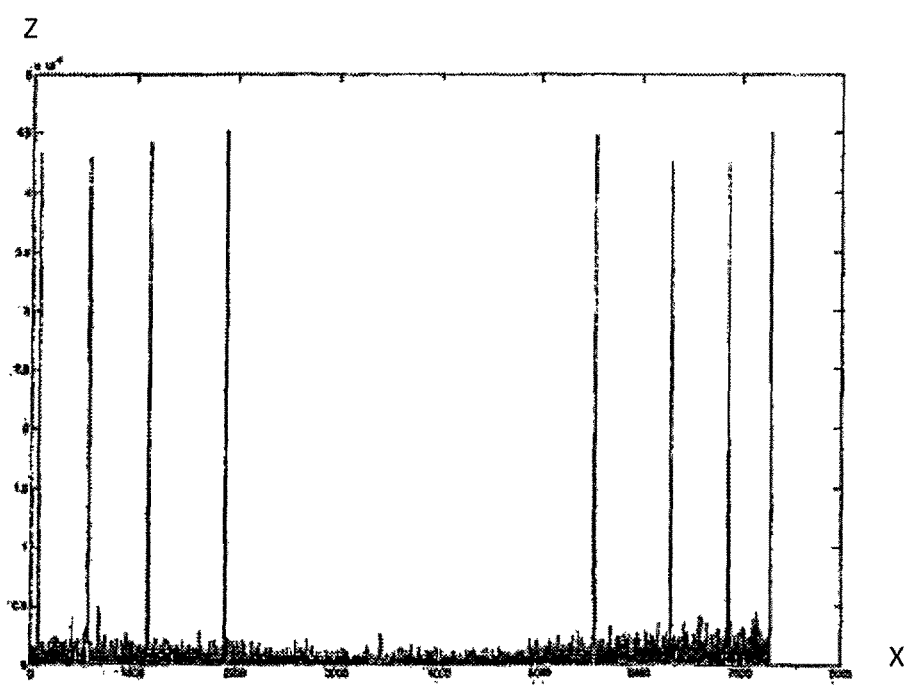
Fig. 25    Position in measurement array

SURFACE MEASUREMENT INSTRUMENT AND METHOD

CROSS REFERENCE TO RELATED APPLICATIONS

THIS APPLICATION IS A U.S. NATIONAL PHASE APPLICATION OF PCT INTERNATIONAL APPLICATION PCT/GB2010/051829, filed Nov. 1, 2010, which claims priority to GB Application No. 0919069.5, filed Oct. 30, 2009 and GB Application No. 1001398.5, filed Jan. 28, 2010 which is incorporated herein by reference.

FIELD OF THE INVENTION

This invention relates to a surface measurement instrument and method for measuring one or more surface characteristics.

BACKGROUND

Taylor Hobson Limited, a division of Ametek Inc., manufactures a number of surface profile or form measuring metrological instruments which use a measurement probe to determine the profiles and geometries of surfaces. In many of these instruments, a mechanical stylus is employed and relative movement is effected between the stylus and the component along a measurement path so that surface changes in the z direction cause an arm carrying the stylus to pivot or rotate about an axis as the stylus follows these surface changes; rotation of the arm, and thereby z displacement, is then measured using an interferometric gauge.

One type of such a metrological instrument manufactured by Taylor Hobson is the Form Talysurf PGI® series. This series of instruments has a particularly good range-to-resolution ratio and so is capable of making measurements of both form and surface roughness or texture on surfaces having a significant degree of form. This makes the use of the Form Talysurf PGI series of instruments particularly advantageous for the measurement of aspheric diffractive lenses (and moulds therefor) as may be employed in infra red imaging devices, digital cameras, mobile telephones, and optical storage devices such as Digital Versatile Disc (DVD) recorders and players.

The form of an aspheric diffractive lens can be described as an aspheric lens having a diffractive structure superposed thereon. The combination in a single lens of both aspheric and diffractive components enables correction in the same lens of both chromatic aberrations and field dependent aberrations. Typically, the diffractive form of such lenses can be mathematically decomposed into a component having a series of steps that are concentric with the axis of rotation of the aspheric component (the aspheric axis) and a component having a rotational polynomial term that ensures that the diffractive structure remains within a specified uniform height band. As another possibility, the diffractive structure may be arranged to have a constant radial distance between the steps.

SUMMARY OF THE INVENTION

In one aspect, the present invention provides a method of and apparatus for characterising a surface. A characterisation instrument performs a measurement operation on the surface by effecting relative movement between the surface and a part of the instrument. Profile data created from the measurement operation and having a series of steps is then received before the characterisation instrument transforms the profile data to produce transformed data having features that coincide with the locations of the step edges in the profile data and locations of these features within the transformed data are then identified.

In one aspect, the present invention provides a method of and apparatus for characterising the surface of an aspheric diffractive structure. A surface characterisation instrument receives measurement data produced by a measurement operation performed on the surface of the aspheric diffractive structure. The instrument fits to the received data a function having an aspheric component before subtracting data representing the fitted function from the received data to produce first subtracted data. Data representing a known polynomial component of a diffractive element of the structure is then subtracted from the first subtracted data to produce stepped data. The locations of the edges of the steps and/or their heights are then determined in order to characterise the surface.

In one embodiment, a function is fitted through the determined locations and heights of the steps and data representing the combination of the fitted function and the steps is produced. This data is then removed from the measurement data to adjust the measurement data and an aspheric component is fitted to the adjusted data. Data representing only the fitted function and the fitted aspheric component are then subtracted from the original measurement data to produce second adjusted data and the process repeats using the second adjusted data in place of the measurement data.

In one aspect, the present invention provides a method of, and data processor for use in, characterising the surface of an aspheric diffractive structure. The data processor receives measurement data resulting from a measurement operation performed on a surface, extracts stepped data having a series of step edges from the measurement data, transforms the stepped data so as to enhance the step edges for identification, and identifies the locations of the step edges in the transformed data.

According to one aspect of the present invention, there is provided a method of characterising the surface of an aspheric diffractive structure and apparatus for carrying out the method. Measurement date representing the results of a measurement operation performed on the surface of the aspheric diffractive structure is received and to this measurement data an equation having aspheric component is fitted. Using the results of the fitting, fitted data is produced that is subtracted from the measurement data. The data resulting from the subtraction operation has one or more steps and the step edge locations and/or step heights are then identified.

According to one aspect of the present invention, there is provided a method of characterising the surface of an aspheric diffractive structure and apparatus for carrying out the method. The method comprising receiving measurement data produced by a measurement operation performed on a diffractive structure. From the measurement data, a plurality of step edge locations and heights are determined and a polynomial is then fitted through these heights and locations to identify an underlying polynomial component of the surface.

When fitting the received data to the function having an aspheric component, the whole of the received data may be used for the fitting process and a user need not provide an initial estimate of the base radius of the function having an aspheric component, thereby producing faster, more accurate results than if a user simply estimated the value of the base radius.

When determining the locations of the edges of the steps and/or their heights, a user need not provide nominal estimates of these locations and/or heights and this may be of particular use for the characterisation of structures that have been specified for operation at a number of wavelengths of light and/or the precise step height is not a priori known. Furthermore, the surface characterisation instrument need not assume that the steps are of equal height, thereby enabling the techniques described herein to be applied to a large range of stepped structures.

Embodiments of the present invention will now be described, by way of example, with reference to the accompanying drawings, in which:

BRIEF DESCRIPTION OF THE DRAWINGS

FIG. 24 shows a profile of the diffractive and stepped components of an aspheric diffractive surface;

FIG. 25 shows transformed data produced by filtering the profile of FIG. 24 using a Haar filter;

DETAILED DESCRIPTION

Figure 1:
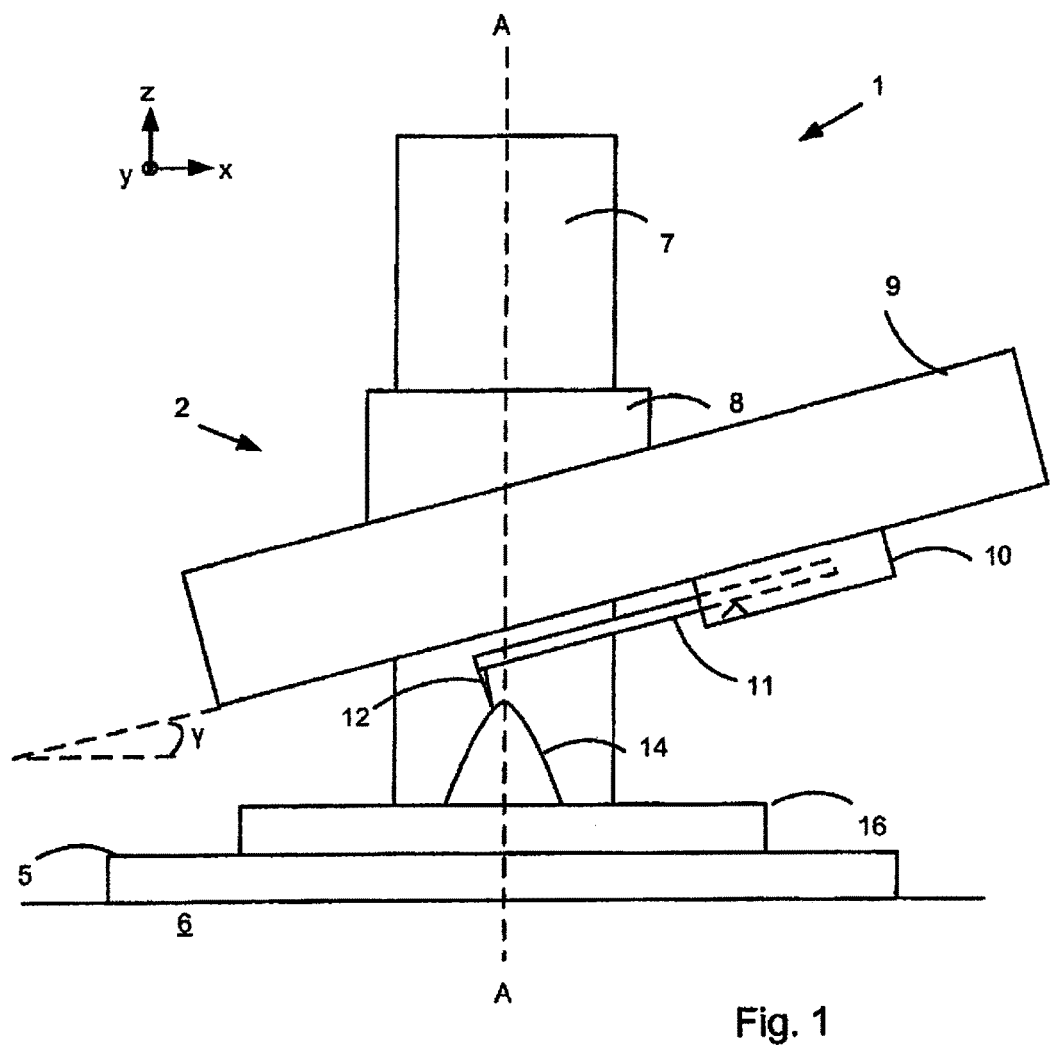
FIG. 1 shows a very schematic representation of a metrological instrument embodying the present invention looking in a direction perpendicular to a measurement direction.

With reference to the drawings in general, it will be appreciated that the Figures are not to scale and that, for example, relative dimensions may have been altered in the interest of clarity in the drawings. Also, any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Overview

Referring now to the drawings, an example metrological instrument will be described which comprises a metrological apparatus and a control apparatus.

FIG. 1 shows a very diagrammatic representation of a metrological apparatus 2 of the metrological instrument 1 looking generally in a y direction (that is the direction perpendicular to a measurement or x direction). It will be appreciated that FIG. 1 is not to scale.

The metrological apparatus 2 has a base 5 (generally formed of cast iron) that is designed to be supported by a workbench 6. The base 5 carries a column 7 that defines a vertical or z axis reference datum. A column carriage 8 is mounted to the column 7 so as to be movable in the z direction with respect to the column 7. The movement of the column carriage 8 is effected by a motorised leadscrew, pulley or other drive arrangement (not shown). The base 5 also carries turntable 16 to support a workpiece 14. The turntable 16 has a centring and levelling mechanism (not shown) such as that shown in FIGS. 2 and 3 of GB 2,189,604A, the whole contents of which are hereby incorporated by reference.

The column carriage 8 carries a traverse unit 9, which is arranged at an angle γ to the x-axis and is movable relative to the column carriage 8 in a direction at an angle γ to the x-axis by means of a motorised drive arrangement (not shown) along a straight reference datum (not shown) provided by the traverse unit 9.

The traverse unit 9 carries a measurement probe (or gauge unit) 10 which, in this embodiment, consists of a pivotally mounted stylus arm (shown very diagrammatically in FIG. 1 in dotted lines within the traverse unit 9) carrying at its free end a stylus arm 11 having a stylus tip 12 which in operation comes into contact with the surface of the workpiece or component under test so that, as the traverse unit 9 is moved in the measurement direction, the stylus arm 11 pivots to enable the stylus tip 12 to follow variations in the z direction (or, if γ is non-zero, in a direction at an angle γ to the x-axis) along a measurement path on the surface.

Control Apparatus

Figure 2:
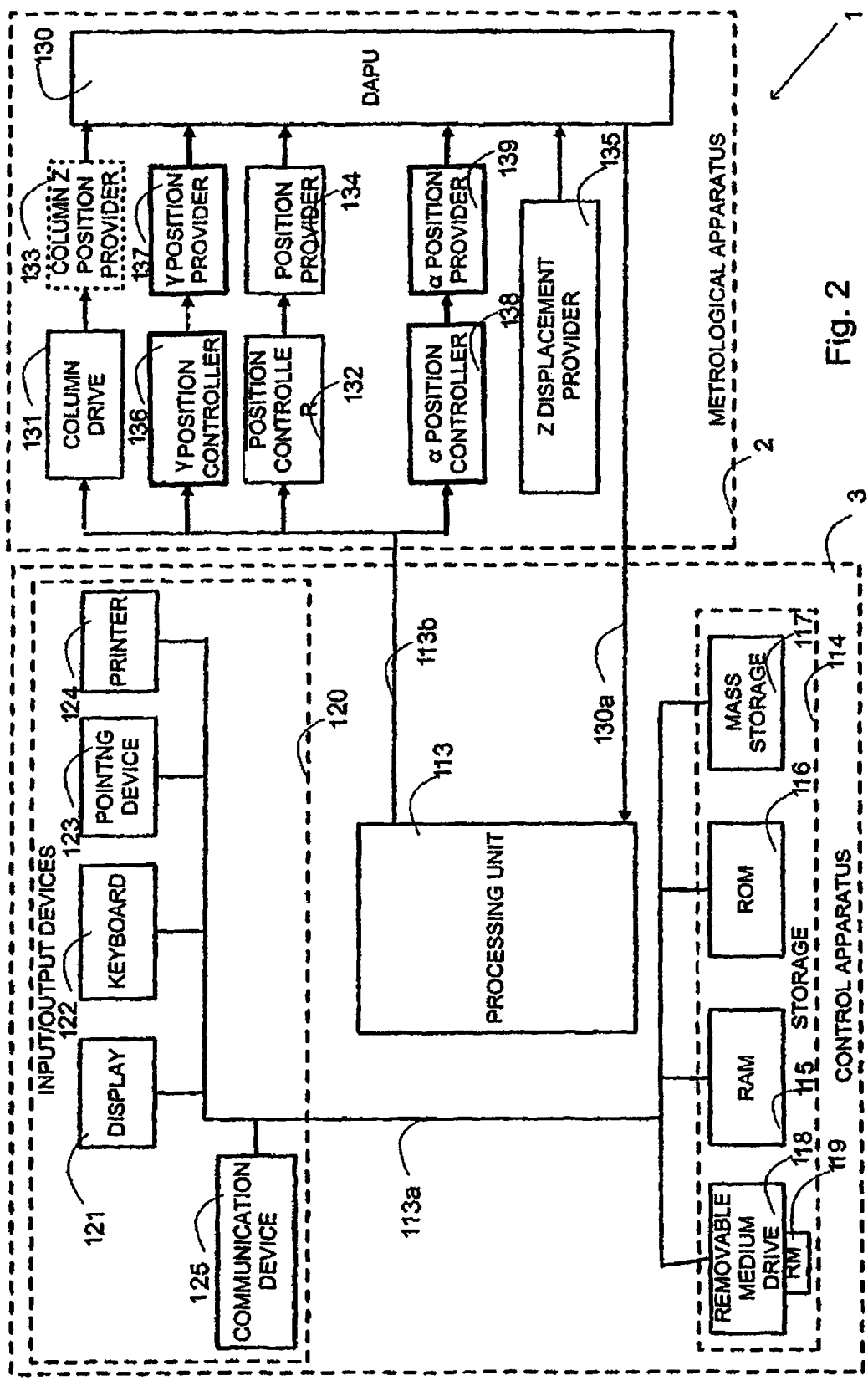
FIG. 2 shows a block diagram of functional components of a measuring apparatus.
Figure 3:
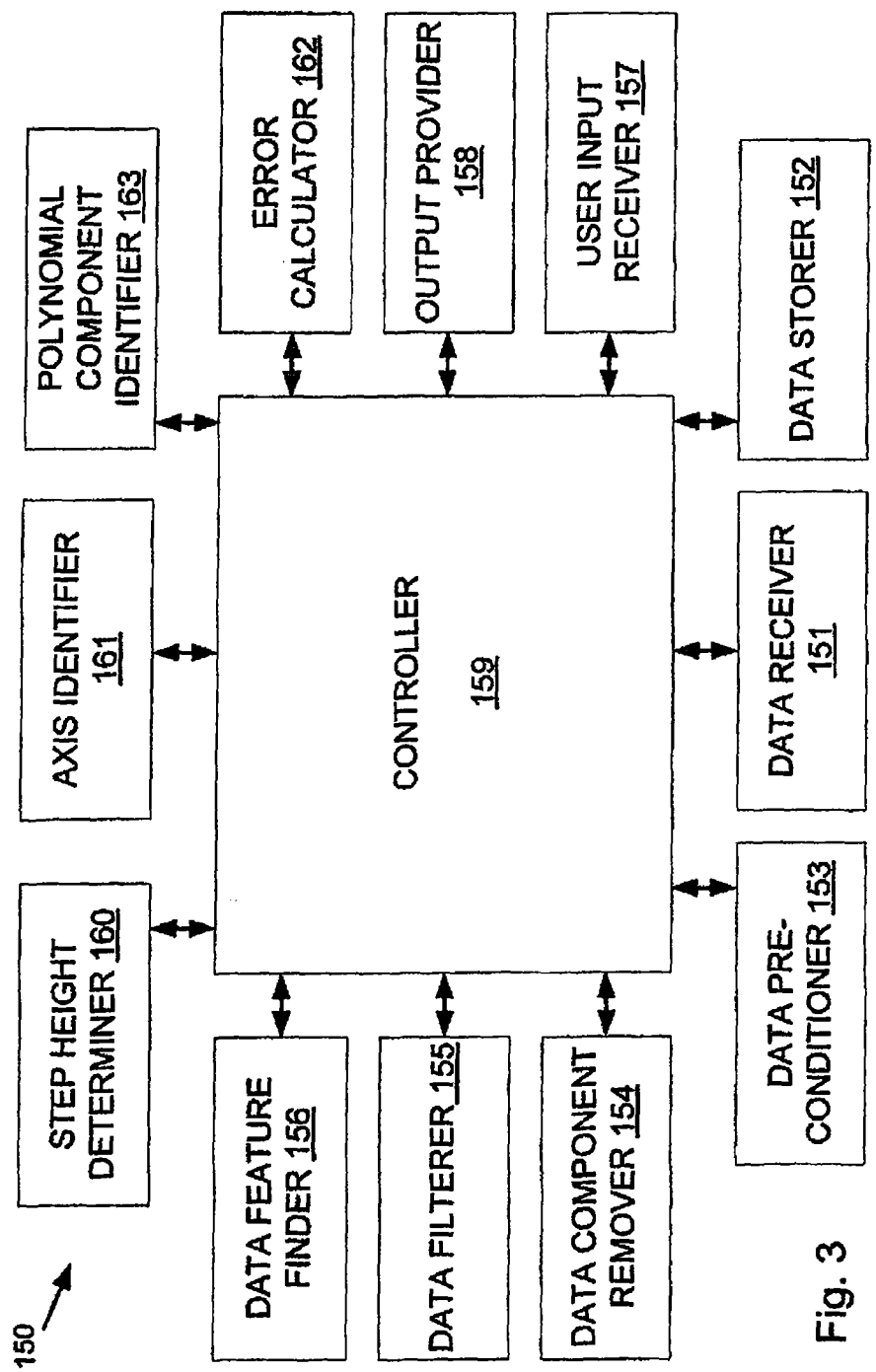
FIG. 3 shows a block diagram of functional components provided by programming of the processing unit of FIG. 2.

FIG. 2 shows a block diagram illustrating the main functional components of both the metrological apparatus 2 and the control apparatus 3 of the metrological instrument 1 while FIG. 3 shows a block diagram of functional components provided by programming of the control apparatus 3.

Referring now to FIG. 2, the control apparatus 3 is generally a personal computer and has a processing unit 113 coupled via a bus 113a to associated data and program instruction/software storage 114 in the form of RAM 115, ROM 116, a mass storage device 117 such as a hard disc drive and at least one removable medium drive 118 for receiving a removable medium (RM) 119, such as a CD-ROM, solid state memory card, DVD, or floppy disc. As another possibility, the removable medium drive may itself be removable, for example it may be an external hard disc drive.

The control apparatus is also coupled via the same or a different bus to input/output devices 120 comprising a display 121, a keyboard 122, a pointing device 123 such as a mouse, a printer 124 and, optionally, a communications device 125 such as at least one of a MODEM and a network card for enabling the control apparatus 3 to communicate signals S via a wired or wireless connection with other control apparatus or computers via a network such as the Internet, an intranet, a WAN or a LAN.

The processing unit 113 is programmed by program instructions and data provided by being at least one of: downloaded as a signal S via the communications device 125; pre-stored in any one or more of ROM 116, RAM 115 and mass storage device 117; read from a removable storage medium 119 received by the removable medium drive 118; and input by the user using the keyboard 122.

The metrological apparatus 2 has a data acquisition and processing unit (DAPU) 130 that communicates with the processing unit 113 of the control apparatus 3 via an appropriate link, for example a serial link, 130a to enable data regarding a measurement operation to be communicated to the control apparatus 3.

The control components of the metrological apparatus 2 comprise a column drive controller 131 for driving the carriage 8 up and down the column in the z direction, a measurement direction position controller 132 for driving the measurement probe or gauge unit along the reference datum provided by the traverse unit 9 in the measurement direction at an angle γ to the x-axis and an interferometric z displacement provider 135 for providing a measure of the z displacement of the stylus tip 12 as the stylus arm 11 follows the surface being measured during movement of the traverse unit 9 along a measurement path in a direction at an angle γ to the x-axis.

If rotation of the turntable is automated, then the metrological apparatus will also comprise an α (where α represents the angle of rotation of the turntable 16 about its spindle axis) position controller 138 for controlling rotation of the turntable 16. Similarly, if the attitude of the traverse unit 9 is adjustable and this adjustment is automated, then a γ position controller 136 will be provided for changing the attitude γ of the traverse unit 9. α and γ position providers 139, 137 (which may for example be shaft encoders, for example optical shaft encoders, or a linear grating type position provider) are provided to supply signals respectively indicating the angle α and γ to the DAPU 130. Generally the interferometric z displacement provider 135 will be provided within the traverse unit 9.

The measurement direction position controller 132 is associated with a position provider 134 that may be, for example, a shaft encoder associated with a motor providing the position controller 132 or may be a linear grating type of transducer. The column drive 131 may also be associated with a column z position provider 133 (shown in phantom lines in FIG. 2), for example a shaft encoder associated with a motor providing the column drive 131, or the column z position may be determined in an open loop manner directly from the column motor drive signal. As show in FIG. 2, the column drive 131 and position controller 132 (and other controllers if present) are coupled to the control apparatus 3 (via a link 113b and appropriate interfaces, not shown) for control by instructions from the control apparatus 3. At least some of these instructions may be supplied by the user.

The processing unit is programmed by program instructions to enable carrying out of measurements. FIG. 3 illustrates the functionality that may be provided by such programming.

In the example shown in FIG. 3, programming of the processing unit 113 provides a data processor 150 comprising: a data receiver 151 for receiving data from the metrological instrument 2, a data storer 152 for storing data; a data pre-conditioner 153 for filtering received data to eliminate noise and other unwanted variations; a data component remover 154 for subtracting a first data set from a second data set so as to remove the data component represented by the first data set from the second data set; a data filterer 155 for filtering data using, in this example, convolution with a Haar filter (as detailed below); a data feature finder 156 for finding features in filtered data, a step height determiner 160 for identifying the height of steps, an axis identifier 161 for identifying the axis of rotational symmetry of an aspheric diffractive lens, and an error calculator 162 for calculating residual errors. The data processor 150 also comprises a user input receiver 157 for receiving user input from the keyboard 122 or pointing device 123 and an output provider 158 for providing output data to at least one of the display 121, the printer 124 and the communications device 125, if present. The data processor 150 further comprises a controller 159 for controlling overall operation of the data processor. Optionally, the data processor may further comprise a polynomial component identifier 163 for identifying a polynomial component of a data set.

Measurement Probe

The measurement probe or gauge unit is in this example the measurement probe used in the instruments supplied by Taylor Hobson as the Form Talysurf PGI series and is described in detail in U.S. Pat. No. 5,517,307 (the whole contents of which are hereby incorporated by reference) to which reference should be made for further information. In particular the measurement probe or gauge unit is based on Taylor Hobson's Form Talysurf PGI 1240 metrological instrument, described in the brochure produced by Taylor Hobson entitled "Form Talysurf PGI 1240, Aspherics Measurement system". This Form Talysurf PGI series of metrological instruments is particularly suited to measuring the surface form (and also roughness) of surfaces having significant form because, as described in U.S. Pat. No. 5,517,307, the interferometric z displacement provider 135 uses a curved diffraction grating that has a radius of curvature which is coincident with the axis about which the stylus arm pivots to provide more accurate z displacement measurements over a longer range.

Figure 4:
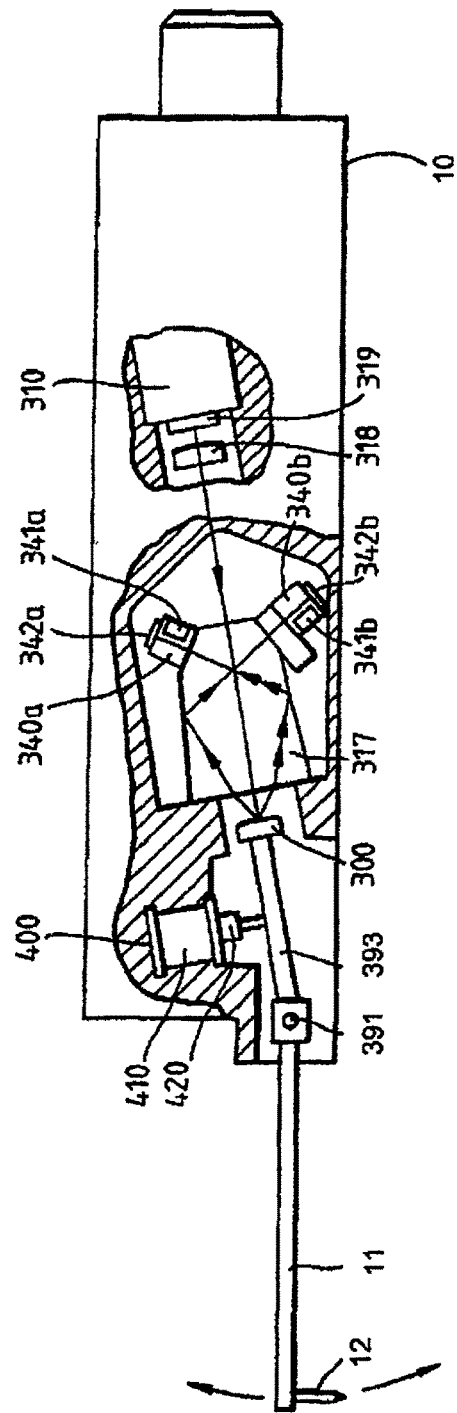
FIG. 4 shows a side view of a measurement probe partially cutaway to show components of the probe.
Figure 5:
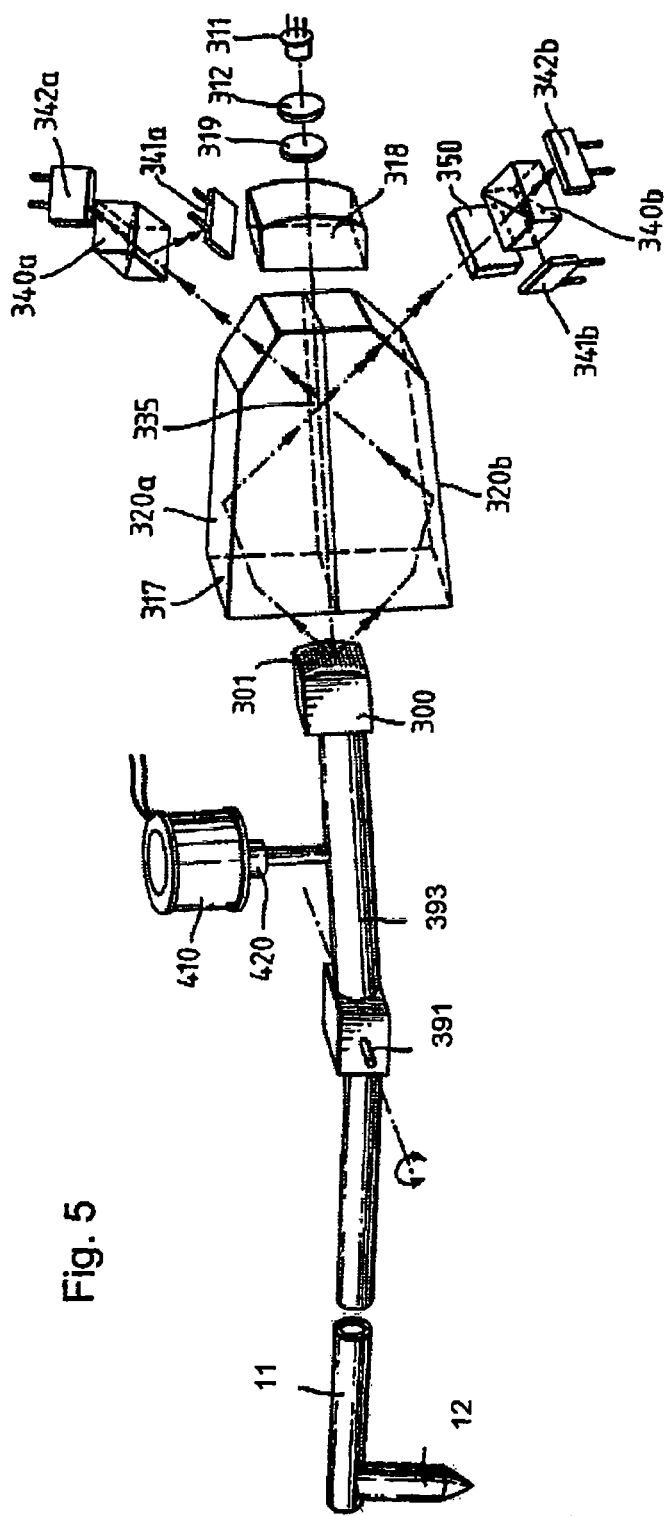
FIG. 5 shows an exploded perspective view of a portion of FIG. 4.

FIGS. 4 and 5 illustrate an example of such a measurement probe in greater detail. Thus, in this example, the measurement probe 10 has a light source 310 comprising a laser diode of wavelength approximately 670 nm, and a collimating lens in the beam. The stylus 11 extends beyond a pivot bearing 391 in a portion 393 upon the end of which is mounted an optical component having a curved face, the curvature of which conforms to that of a circular arc centred at the pivot bearing 391. On the curved face is provided a diffraction grating comprising a plurality of parallel diffracting features inclined parallel to the pivot 391. Light from the light source 310 is directed straight through a prism 317, normally onto the surface of the diffracting grating 300. Two diffracted first order beams produced by the diffraction grating 300 enter the prism 317 which provides two output beams each of which passes through a respective output analyzer comprising a beam splitter prism. One beam splitter prism 340b is preceded by a quarter wave length plate 350. Provided on two faces of each analyzer beam splitter 340a, 340b are respective detectors 341a, 342a, 341b, 342b. Each detector comprises a photodiode responsive to the amplitude of light thereon to generate a corresponding electrical output signal. A lens 318 acts to converge the collimated beam from the light source 310 so as to reduce the divergence produced by the curvature of the diffraction grating 300.

Further provided, connected to the stylus 11, is a biasing force arrangement comprising a linear electromagnetic coil 410 surrounding a linear magnetic armature or pole piece 420 connected to the support arm 393 so as to exert a pulling or pushing force thereon in accordance with the current supplied to the coil 410.

Typically, the beam produced by the laser diode and collimator lens is about 2 mm wide. The collimated beam passes through a halfwave thickness transparent plate 319 provided to enable adjustment of the polarization direction of the beam. The light beam is directed through a cylindrical shaped lens 318 which converges the collimated beam. In the absence of the cylindrical lens 318, the collimated beam would, when diffracted by the convex curved diffraction grating 300, produce diverging diffracted output beams. By providing the cylindrical lens 318, a corresponding convergence in the input beam is provided so that the diffracted beams from the diffraction grating are collimated. The lens 318 may also correct any divergence or convergence in the beam from the light source 310.

A pair of first order diffracted beams is produced at an angle theta dependent upon the illuminating wave length lambda and the pitch or spacing between lines of the grating; for a pitch of 1200 lines/mm and illuminating wavelength of 670 nm, the diffraction angle theta relative to a normal axis to the grating is approximately 54°. The two diffracted beams enter the rear planar surface of the prism 317 and are refracted thereby by an amount dependent upon the refractive index thereof. The refracted beams each impinge upon a respective side face 320a, 320b of the prism and, provided the angle of incidence thereon is greater than the critical angle for total internal reflection angle for the material of which the prism is made, are reflected back towards the centre of the prism. The inclinations of the faces 320, 320b to the centre of the prism are equal and opposite so that the two beams meet the centre of the prism at the same point.

Disposed along the longitudinal centre plane of the prism is a dielectric layer 335 arranged, as is conventional, to respond to an incident light beam by transmitting a portion thereof in a first polarization plane and reflecting a portion thereof in a second polarization plane (the S and P polarizations).

The planar layer 335 therefore reflects a portion of each diffracted beam coincidentally with a transmitted portion of the other, to produce combined output beams. However, of each combined beam, the reflected and transmitted portions exhibit different polarization and their amplitudes are therefore not additive. Each beam leaves the prism 317 through an end face normally inclined to the beam path. One beam enters an analyzer 340a; the second enters a quarter wave plate 350 prior to entering an analyzer 340b.

Each analyzer 340 comprises a further beam splitting prism, each comprising a cubic prism cut along a diagonal plane, including a dielectric layer structure between the two halves thereof. The effect of the dielectric layer in the 45° diagonal plane of each analyzer is to act as a beam splitter, transmitting one portion of an incident beam and reflecting a second. The rotational orientation of the diagonal plane of each beam splitter 340a, 340b is so selected that each of the reflected and transmitted beams produced thereby includes an equal proportion of the S and P polarizations of the output beam from the prism 317, and hence an equal proportion of each of the diffracted orders from the diffraction grating 300. The beam splitter prisms 340a, 340b are therefore rotationally inclined at 45° to the planes of the prism 317 which they face. Conveniently, the beam splitter 340a is adhesively cemented to one end face of the prism 317, and the quarter wave plate 350 and beam splitter 340b are cemented in that order to the other.

A photodetector (for example, a photodiode) 341a, 341b is provided to receive the reflected beam from each respective analyzer 340a, 340b and a further detector 342a, 342b is provided to receive the transmitted output from a respective beam splitter 340a, 340b. The reflected output in each case is phase shifted by 180° due to the reflection.

Further explanation of such a measurement probe as may be suitable for use with the present invention may be found as discussed in U.S. Pat. No. 5,517,307, the whole contents of which are hereby incorporated by reference.

Surface Characterisation—Method 1

In order for a manufacturer or user of an aspheric diffractive lens to determine how well a given lens conforms to its design specification, the surface of the lens must be characterised. Characterisation of the locations of the stepped surface structures of the diffractive component of an aspheric diffractive lens is particularly important as these locations are critical to the performance of the lens. A first method of characterising the surface of an aspheric diffractive lens will now be described with reference to FIG. 6 which is a flow chart illustrating processes carried out by the data processor 150.

It is assumed that the centring and levelling turntable 16 support assembly has already been precisely positioned on the base 5. Therefore, initially a set up procedure comprising a cresting process is carried out to align the axis of rotational symmetry of the workpiece 14 to the axis of rotation of the turntable 16 (indicated by dashed line A-A in FIG. 1).

Once the set up procedure has been completed, the operator instructs (via the keyboard 122 and/or the pointing device 123) the control apparatus of the metrological instrument to cause a measurement procedure to be carried out on the workpiece 14. The measurement path is chosen so that it includes the reference axis of the workpiece 14, that is, in this case the axis of rotational symmetry of the workpiece 14. As the traverse unit 9 moves the stylus tip 12 over the workpiece 14, the interferometric z displacement provider 135 provides to the DAPU 130 measurement data representing the profile of the workpiece 14, that is, the change in z displacement of the stylus tip 12 with x along the measurement path.

Figure 6:
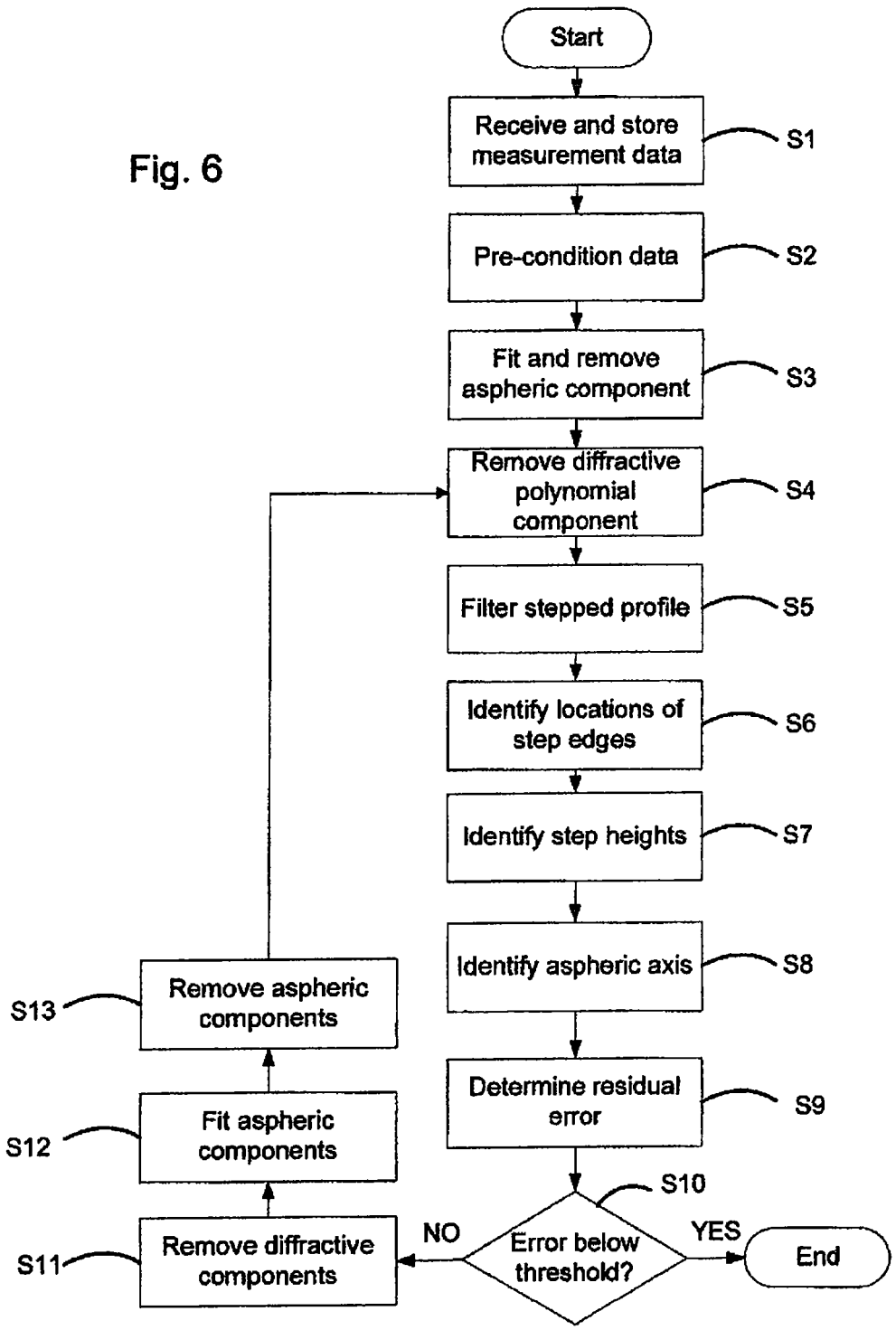
FIG. 6 shows a flow chart illustrating steps carried out by the control apparatus to characterise a workpiece having an aspheric diffractive structure.

At S1 in FIG. 6, the data receiver 151 of the data processor 150 receives the measurement data from the DAPU 130. The controller 159 causes this data to be stored by the data storer 152 so that, at the end of the measurement procedure, the data storer 152 stores a measurement data set representing the measurement over the measurement path.

Figure 7:
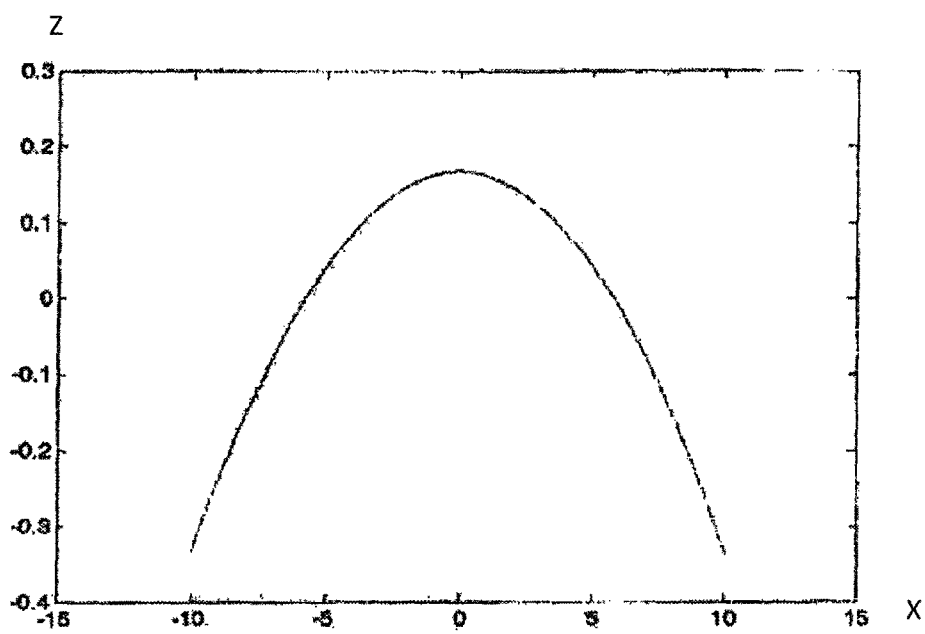
FIG. 7 shows a pre-conditioned measurement trace taken on an aspheric diffractive lens.

Once the controller 159 determines that the measurement data set has been obtained and stored, the controller 159 may instruct the data pre-conditioner 153 to pre-condition the data at S2 of FIG. 6 by, for example, filtering to remove noise or variations due to environmental conditions or contamination. In this embodiment, an alternating sequence ball filter is used to suppress asperities prior to the data fitting procedures described below. As thus described, the filter is a software filter implemented by the data processor. The filter may, however, be implemented in hardware within the DAPU 130 before the data is supplied to the control apparatus 3, in which case the data pre-conditioner shown in FIG. 3 and the procedure S2 in FIG. 6 will be omitted. In this example, the data receiver or acquirer is provided by a graphics package supplied by Taylor Hobson under the trade name μLTRA for use with, amongst others, the Form Talysurf P01 series of instruments. FIG. 7 shows a pre-conditioned measurement trace taken on an aspheric diffractive lens.

The controller 159 then causes the output provider 158 to advise the user via the display 121 that the measurement has been completed. In this example, the operator then instructs (via the keyboard 122 and/or pointing device 123) the control apparatus 3 of the metrological instrument 1 to cause a characterisation process to be run to characterise the workpiece 14.

Removing Aspheric Component from Measurement Data

The profile of an aspheric component is typically represented by an aspheric equation of the form:

$$z = \left( \frac{\pm x^2}{R + \sqrt{R^2 - (1+k)x^2}} \right) + A_1|x| + A_2|x|^2 \ldots + A_{10}|x|^{10}$$

where the term $$\left( \frac{\pm x^2}{R + \sqrt{R^2 - (1+k)x^2}} \right)$$

represents the conic component of the aspheric equation and the term $$A_1|x| + A_2|x|^2 \ldots + A_{10}|x|^{10}$$

represents the polynomial component of the aspheric equation, and where z is the height of the aspheric component at position x, R is the aspheric base radius, k is the conic constant and $A_1$ to $A_{10}$ are constants for the polynomial component of the aspheric component. A person skilled in the art will appreciate that, although the above conic equation is conventionally expressed as having polynomial elements up to the tenth order of x, greater or lesser orders may equally be employed.

Figure 8:
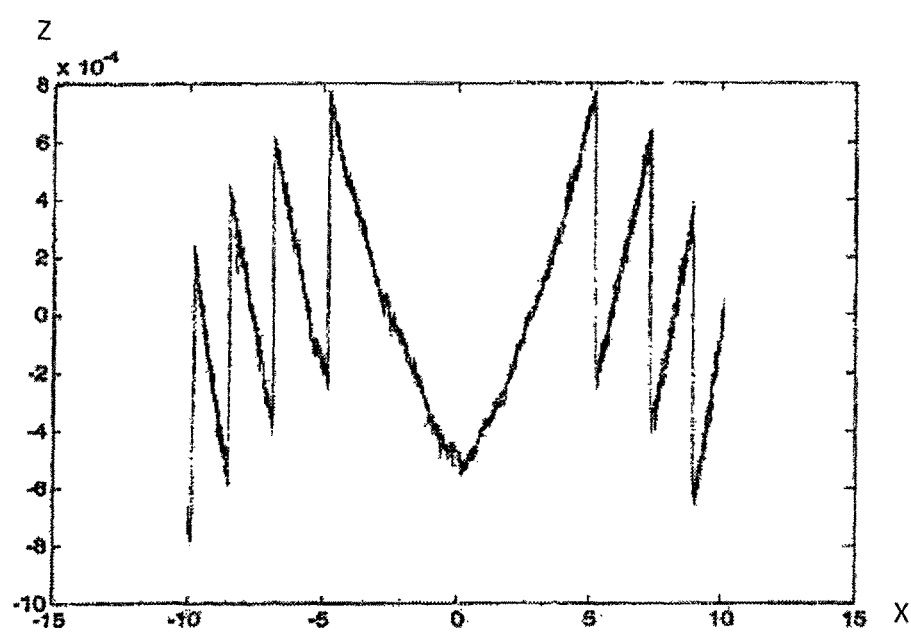
FIG. 8 shows the trace of FIG. 7 after subtraction of a fitted aspheric function.

To remove the aspheric component from the pre-conditioned measurement data, at S3 of FIG. 6, the data component remover 154 of the data processor 150 receives the preconditioned measurement data from the DAPU 130 before fitting the conic component of the above aspheric equation to the preconditioned measurement data using a known optimisation algorithm and a user provided k constant value to determine R—the aspheric base radius. The transformation required to transform the fitted conic so that its axis of rotation lies along the z axis may then be calculated and applied to the preconditioned measurement data so as to centre it about the z axis. The data component remover 154 then subtracts the fitted conic component from the preconditioned measurement data before using a known optimisation algorithm to fit the polynomial component of the above aspheric equation to the data resulting from the subtraction of the conic component from the preconditioned measurement data. The data component remover 154 then subtracts the fitted polynomial component from the data resulting from the subtraction of the conic component from the preconditioned measurement data to produce profile data that represents the non-aspheric components of the workpiece 14. FIG. 8 shows the trace of FIG. 7 after subtraction of fitted aspheric conic and polynomial components.

Removing Diffractive Polynomial to Produce Stepped Profile

Figure 9:
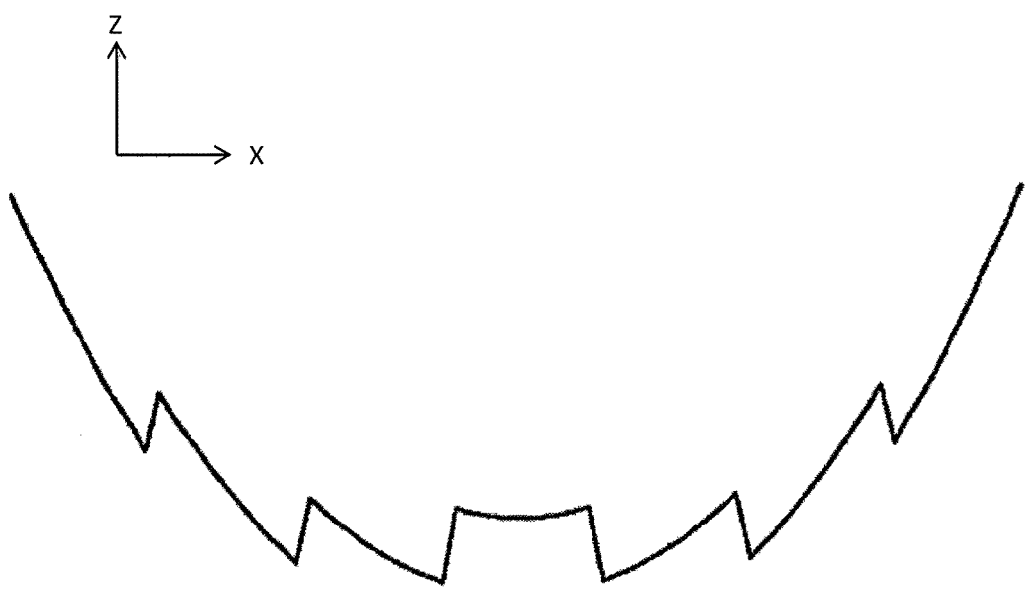
FIG. 9 shows a very diagrammatic representation of the diffractive component of an aspheric diffractive lens.
Figure 10:
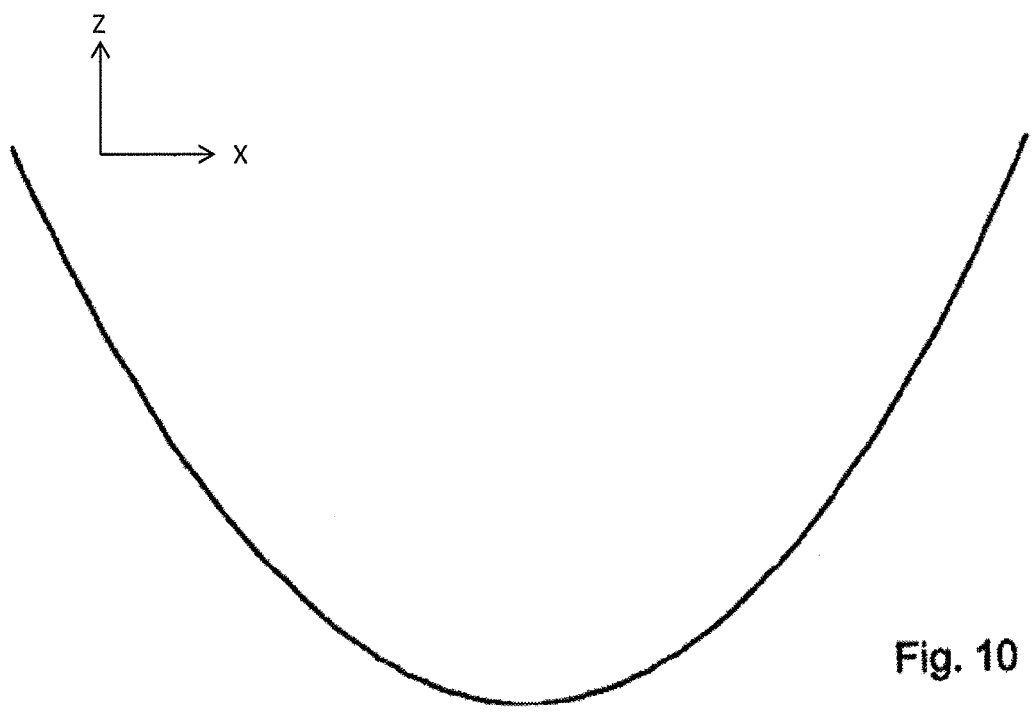
FIG. 10 shows a very diagrammatic representation of the polynomial component of the diffractive component shown in FIG. 9.
Figure 11:
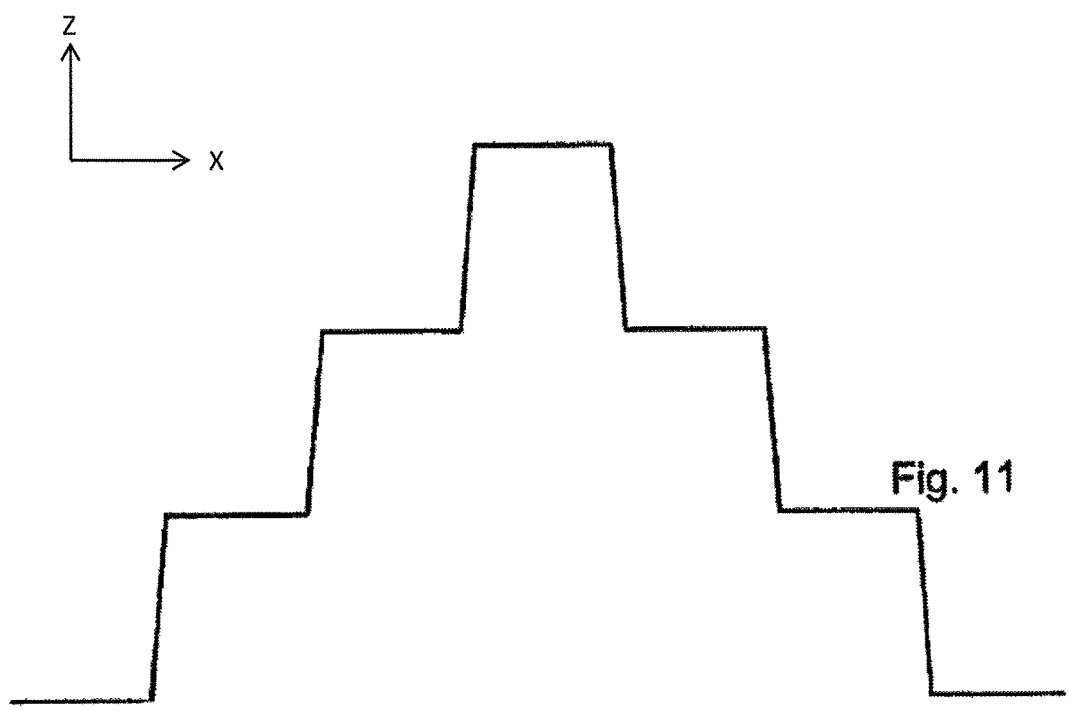
FIG. 11 shows a very diagrammatic representation of the stepped component of the diffractive component shown in FIG. 9.
Figure 12:
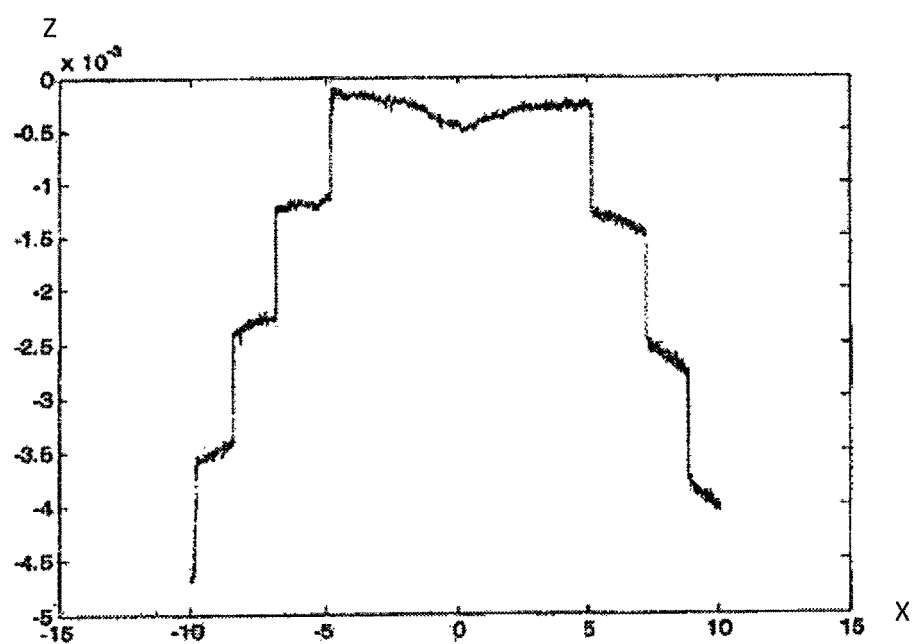
FIG. 12 shows an example stepped profile produced from the trace of FIG. 8.

FIG. 9 shows a very diagrammatic representation of the diffractive component of an aspheric diffractive lens. The diffractive component can be decomposed into a polynomial component that is symmetric about the z-axis (as shown very diagrammatically in FIG. 10) and a stepped component having a shape somewhat similar to that of a layered British wedding cake (as shown very diagrammatically in FIG. 11). Generally, for a given aspheric diffractive lens, the form of the diffractive polynomial component is specified prior to manufacture and so is known and can be removed in order to determine the stepped profile. Accordingly, at step S4 of FIG. 6, the data component remover 154 subtracts the known diffractive polynomial component from the profile data produced at step S3 of FIG. 6 to produce a stepped profile representing the diffractive stepped component of the aspheric diffractive lens combined with a residual error component. FIG. 12 shows an example stepped profile produced from the trace of FIG. 8. As can be seen, the x axis of FIG. 12 shows the measured distance from the z-axis of each measurement—in the case of FIG. 12, around 7500 measurements were taken and recorded in a measurement array in one or more of ROM 116, RAM 115 and mass storage device 117.

Processing Stepped Profile to Identify Locations of Step Edges

Figure 13:
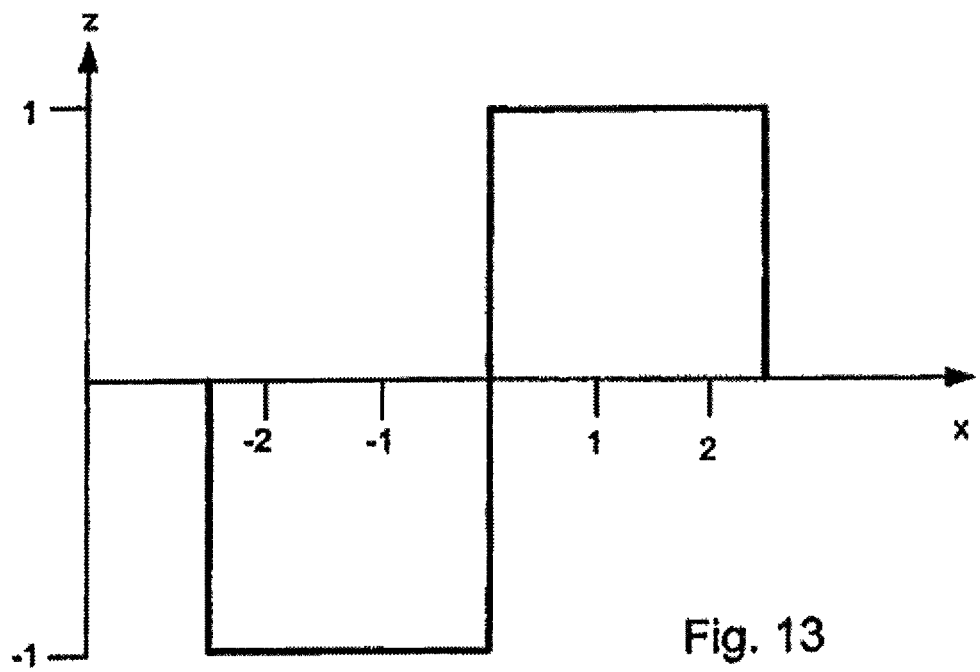
FIG. 13 shows a diagrammatic representation of a Haar filter.

To identify the x-locations of the jumps or step edges in the stepped profile, at step S5 of FIG. 6, the controller 159 instructs the data filterer 155 to filter the stepped profile using an edge detecting operator to produce transformed data having features that correspond to the stepped profile's step edges. In this case, the data filterer 155 convolves the stepped profile with a Haar filter having a profile as diagrammatically represented in FIG. 13 to transform the stepped profile into transformed data having peaks at locations corresponding to the locations of the step edges.

Figure 14:
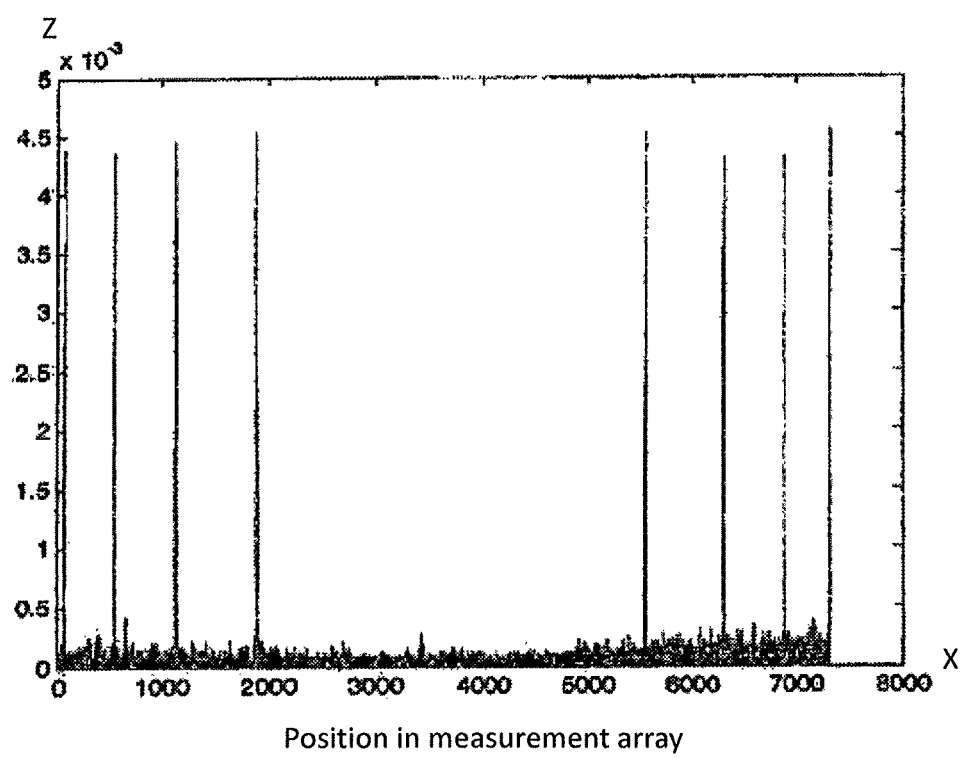
FIG. 14 shows transformed data produced by filtering the stepped profile of FIG. 12 using a Haar filter.

To convolve the stepped profile with a Haar filter, for each x position at which a z value is present in the stepped profile, a weighted sum of the neighbouring z values is calculated. As a purely illustrative example, the Haar filter profile of FIG. 13 has z weightings of −1 at x=−2 and x=−1, 0 at x=0, and 1 at x=1 and x=2 and the transformed data $TX_n$ at x position $x_n$ may be calculated as follows: $TX_n = -1*z_{n-2} - 1*z_{n-1} + 0*z_n + 1*z_{n+1} + 1*z_{n+2}$, where $z_{n-2}, z_{n-1}, z_n, z_{n+1}$, and $z_{n+2}$ are the z values of the stepped profile at positions $x_{n-2}$, $x_{n-1}$, $x_n$, $x_{n+1}$, and $x_{n+2}$ respectively. A person skilled in the art will appreciate that other shapes and sizes of profile could equally be convolved with the stepped profile to transform it. FIG. 14 shows transformed data produced by filtering the stepped profile of FIG. 12 using a Haar filter. As can be seen, the x axis of FIG. 14 differs from that of FIG. 12 in that, instead of showing the x position at which each measurement was taken, the position of each measurement in the measurement array is shown—a person skilled in the art will understand that the x axes of FIGS. 12 and 14 may be used interchangeably.

At step S6 of FIG. 6, the controller 159 instructs the data feature finder 156 to determine the locations of the features in the transformed data. The data feature finder 156 uses pattern recognition, for example by segmenting the transformed data using a known segmentation algorithm, in this case a watershed algorithm.

The data feature finder 156 then determines the locations in the stepped profile that correspond to the determined locations of the features in the transformed data. If the transformed data and the stepped profile share the same x-axis, then the locations of the step edges in the stepped profile are identified as being the same as the determined locations in the transformed data. If instead, the transformed data and the stepped profile have different x-axes, then the data feature finder 156 identifies the transformation required to transform the determined locations into the coordinate system of the stepped profile. To identify the locations of the step edges in the stepped profile, the determined locations are then transformed using the identified transformation.

Processing Stepped Profile to Identify the Height of Steps

Figure 15:
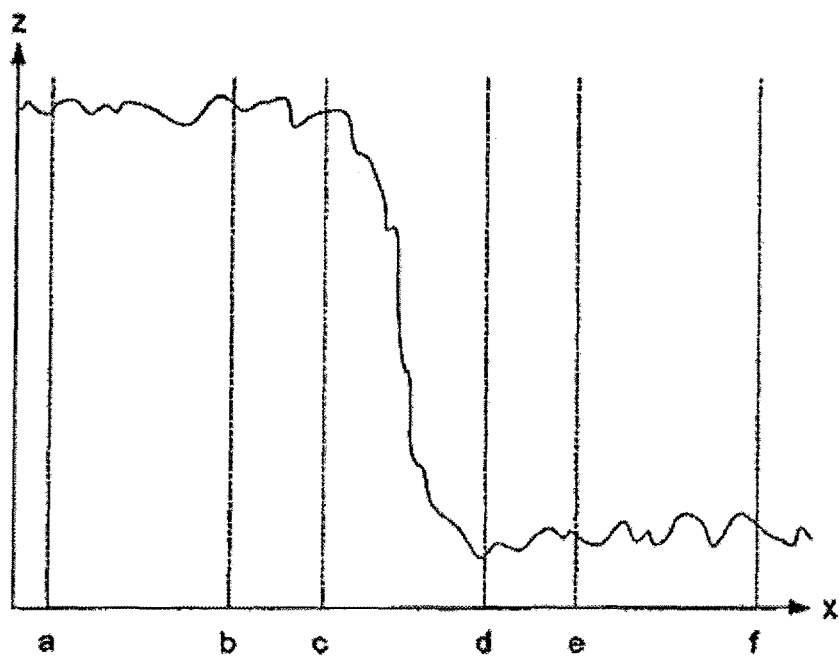
FIG. 15 shows a diagrammatic representation of a portion of a stepped profile.

To determine the z-direction heights of the steps, at step S7 of FIG. 6, the step height determiner 160 fits step functions to each of the steps in the stepped profile. A diagrammatic representation of a stepped portion of a stepped profile is shown in FIG. 15, the profile of which has a top portion between x-positions a and c, a bottom portion between x-positions d and e, and a transition portion between x-positions c and d. To remove from the fitting process the effect of errors in the identified location of the step edge and/or any shape imperfections at the junction of the step top/bottom and the step edge, for each step, only a subset of the profile data is used for fitting to a step function. To determine this subset, the step height determiner 160 first identifies the location in the transformed data of, in this case, a valley (although other local features could alternatively be used) on either side of each identified peak—the identified valley locations in the transformed data indicating the borders of the region over which the step transition occurs. The step height determiner 160 then identifies the locations in the stepped profile that correspond to the determined valley locations. In FIG. 15, x-positions c and d correspond to the determined valley locations and the x-interval c-d represents a window within which the step edge occurs.

As shape imperfections at the junction of the step top/bottom and the step edge may occur outside the c-d window, the step height determiner 160 enlarges the window c-d by a predetermined amount to ensure that both the step edge and any junction imperfections lie within the new, enlarged, window; the x-interval b-e of FIG. 15 illustrates an enlarged window.

The step height determiner 160 then identifies windows either side of the enlarged window over which to fit a step function as illustrated by x-intervals a-b and e-f of FIG. 15. In this case, the size of these fitting windows is predetermined. A step function of the form $$z = A + Bx + h\delta$$

where $\delta = 1$ for $a \leq x \leq b$, and $\delta = -1$ for $e \leq x \leq f$, is then fitted by the data feature finder 156 to the stepped profile data lying within the fitting windows a-b and e-f using, in this case, a least squares optimisation algorithm and the step height, which equals 2 h is then determined.

Identifying Aspheric Axis

As the diffractive component of the aspheric diffractive lens is centred about the axis of rotational symmetry of the lens and the measurement path includes this axis, the location of the axis of the aspheric diffractive lens corresponds to the centre of the stepped profile. To determine the centre of the stepped profile, at step S8 of FIG. 6 the axis identifier 161 identifies the pairs of step edges that correspond to concentric steps on the aspheric diffractive lens. One way of identifying such pairs of step edges is to start at the zero position on the x-axis of the stepped profile (see FIG. 12) and to then look in the positive x-direction for the first identified step edge before, starting at the zero position on the x-axis of the stepped profile, looking in the negative x-direction for the partner to the first identified step edge before repeating this process for the second, third etc. identified step edges; a person skilled in the art will appreciate a number of alternative manners that the pairs of step edges could instead be identified.

For each pair of step edges, the axis identifier 161 then determines the median x-position of the two edges. From the resulting list of median locations, the data feature finder 156 calculates the median of the medians to determine the x-location of the axis of the aspheric diffractive lens.

At this point, the location of the step edges, the step heights, and the axis of symmetry have all been determined thereby characterising the stepped profile and the process may stop. In this embodiment however, the process proceeds as set out below.

Determining Residual Error

Figure 16:
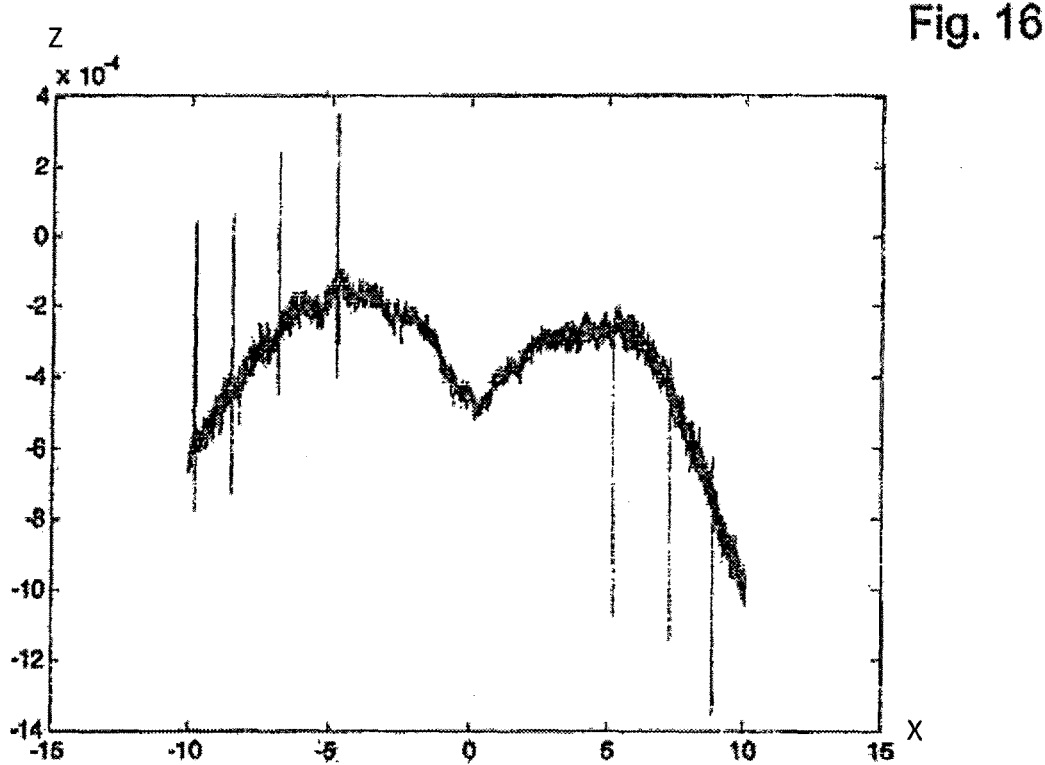
FIG. 16 shows a residual error profile for the stepped profile of FIG. 12.
Figure 17:
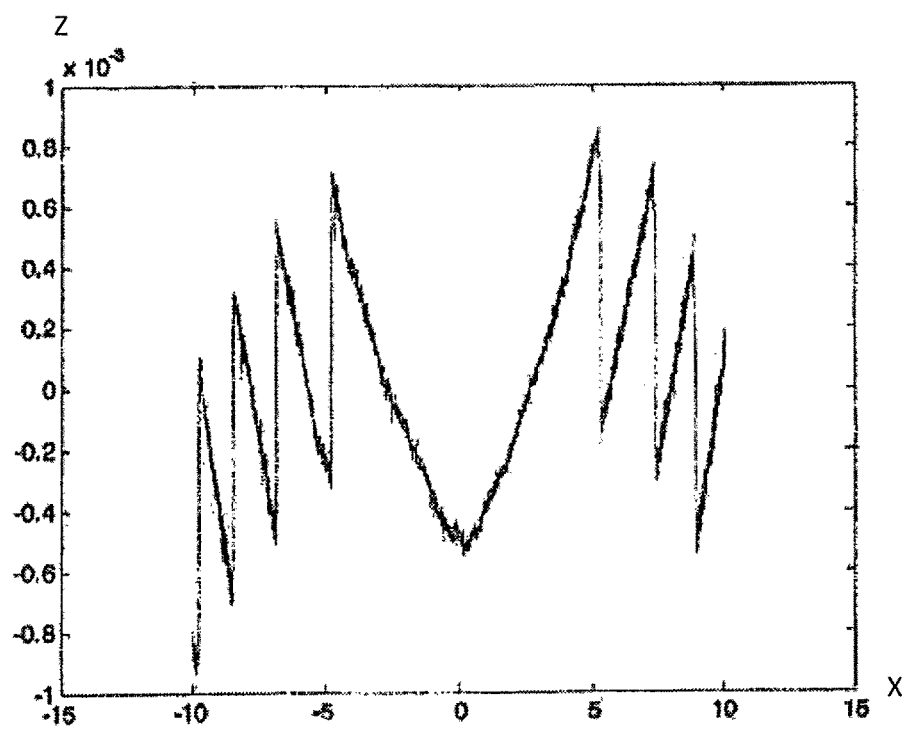
FIGS. 17, 18, 19 and 20 show profiles corresponding respectively to those of FIGS. 8, 12, 14, and 16 as produced by an iterative process.
Figure 18:
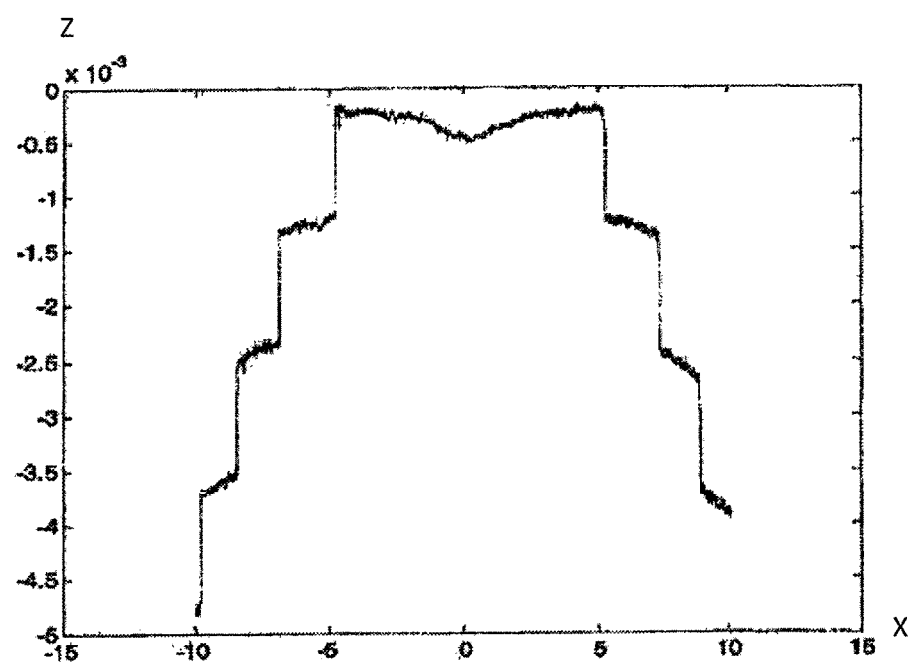
Figure 19:
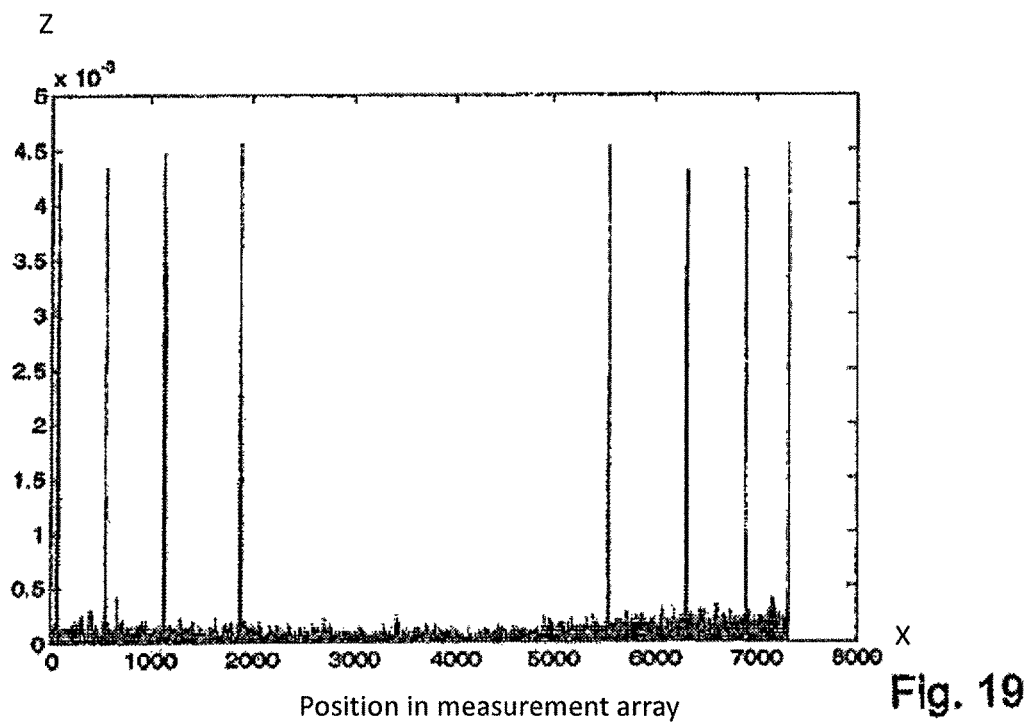

Once the data feature finder 156 has identified the location of the step edges and the step height determiner 160 has determined the heights of the associated steps, at step S9 of FIG. 6 the error calculator 162 creates a profile having steps of the determined height positioned at the identified locations and subtracts this profile from the stepped profile to produce a profile of the residual errors. FIG. 16 shows a residual error profile for the stepped profile of FIG. 12.

Iterative Surface Characterisation

In this embodiment, the location of the step edges and the step heights is iteratively determined as set out below.

After producing a residual error plot, the error calculator 162 calculates an error metric representing the total error contained in the error plot. A person skilled in the art will be aware of a large range of metrics that could be calculated from the data contained in the error plot and used as an error measure, for example, the mean or median error, the RMS (root mean squared) error etc.

At step S10 of FIG. 6 the data processor 150 checks whether the calculated error metric is below a predetermined threshold. If the error is below the predetermined threshold, then the controller 159 causes the output provider 158 to display via the display 121 the calculated step locations and heights, the residual error for these locations and heights, and the location of the aspheric axis; the process then ends. Otherwise, the process proceeds to step S11 of FIG. 6 where the data component remover 154 creates a stepped profile having steps of the determined height positioned at the identified locations and superposes upon this profile the known diffractive polynomial to produce a profile similar to that shown in FIG. 9. The produced profile represents the determined diffractive component of the aspheric diffractive lens. The data component remover 154 then subtracts the produced profile from the preconditioned measurement data to produce a profile that represents only the aspheric components of the aspheric diffractive lens.

At step S12 of FIG. 6, the data component remover 154 centres the profile that represents only the aspheric components of the aspheric diffractive lens about the z axis using a known affine centring method, and then fits the conic component of the above aspheric equation to the preconditioned measurement data using a known optimisation algorithm. The data component remover 154 then subtracts the fitted conic component from the profile that represents only the aspheric components of the aspheric diffractive lens before using a known optimisation algorithm to fit the polynomial component of the above aspheric equation to the data resulting from the subtraction of the conic component from the profile that represents only the aspheric components of the aspheric diffractive lens.

At step S13 of FIG. 6 the data component remover 154 subtracts both the fitted conic and polynomial component from the preconditioned measurement data to produce profile data that represents the non-aspheric components of the workpiece 14.

Figure 20:
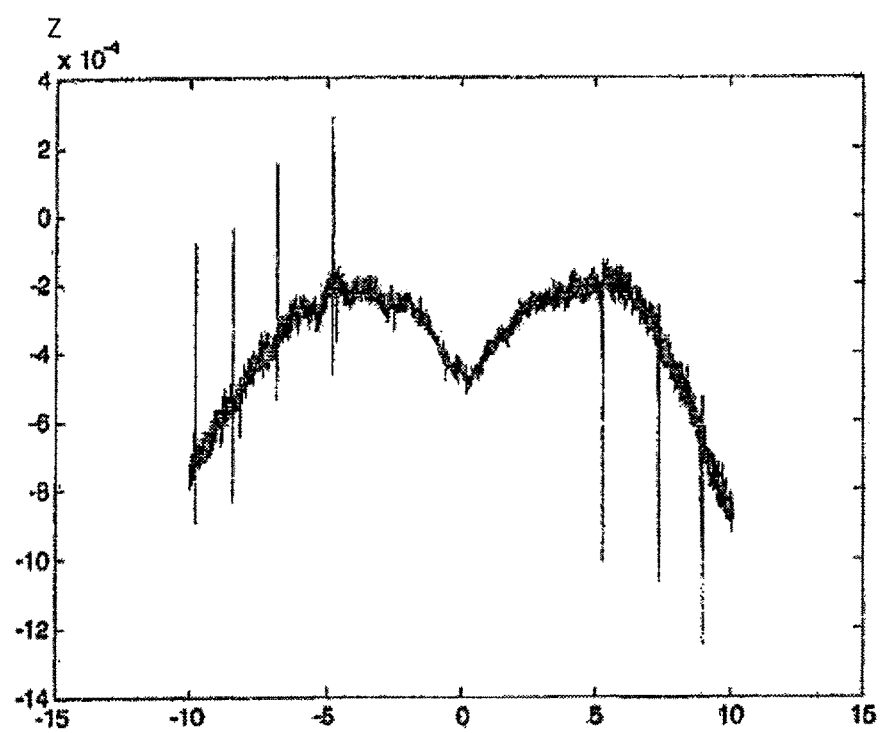

The process then returns to step S4 of FIG. 6 and iterates until the determined residual error is below the predetermined threshold and the process ends at step S10 of FIG. 6. FIGS. 17, 18, 19 and 20 show profiles corresponding respectively to those of FIGS. 8, 12, 14, and 16 as produced by a second iteration of the above described process. As can be seen, the residual error shown in FIG. 20 is less, and more uniformly distributed, than the residual error shown in FIG. 16.

Surface Characterisation—Method 2

A second method of characterising the surface of an aspheric diffractive structure will now be described with reference to FIG. 21 which is a flow chart illustrating processes carried out by the data processor 150. Steps SS1, SS2 and SS3 of method 2 correspond respectively to steps S1, S2, and S3 of method 1 (see above).

Identifying the Location of Step Edges

Figure 21:
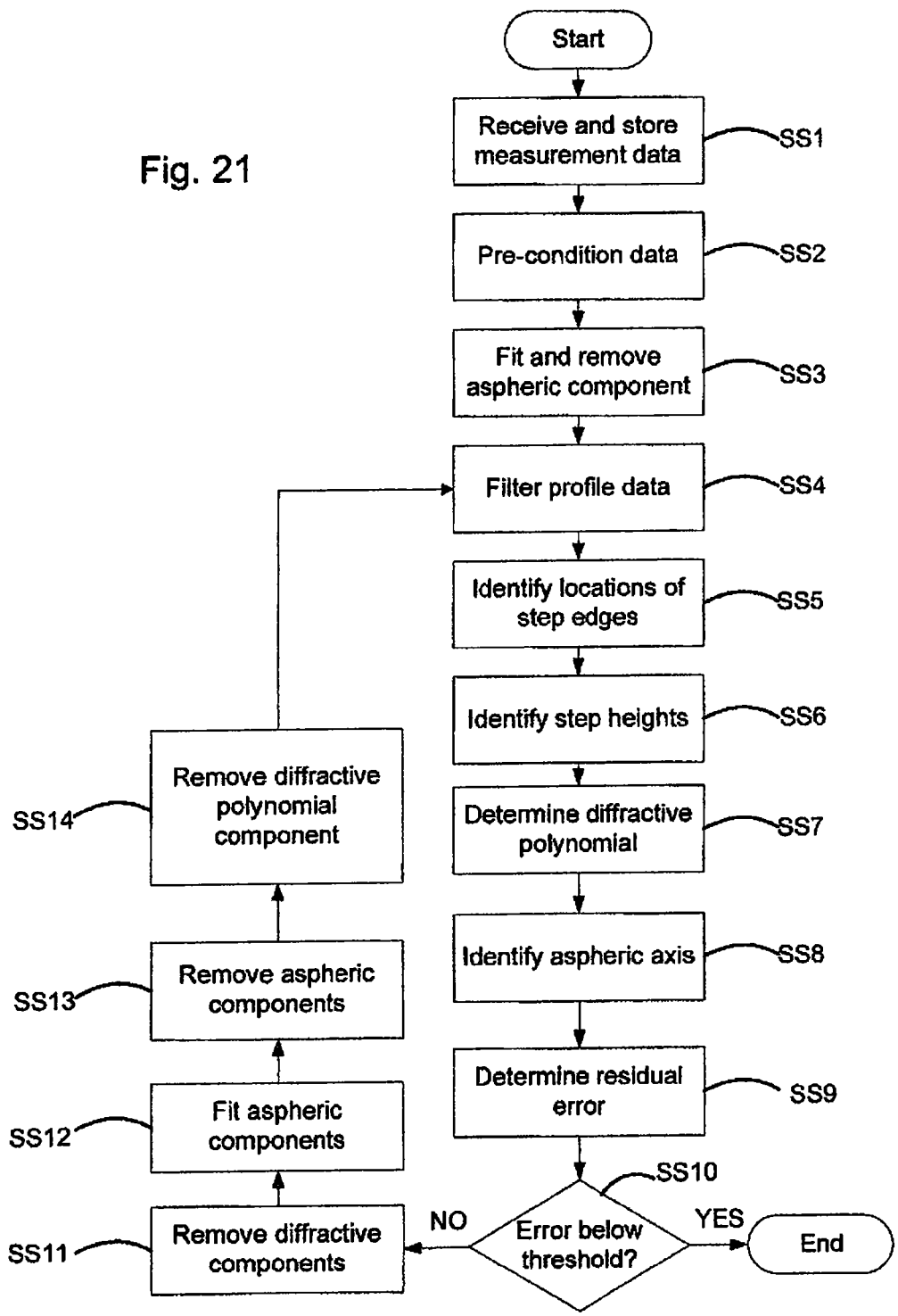
FIG. 21 shows a flow chart illustrating steps carried out by the control apparatus to characterise a workpiece having an aspheric diffractive structure.

To identify the x-locations of the jumps or step edges in the profile data, at step SS5 of FIG. 21, the controller 159 instructs the data filterer 155 to filter the profile data (an example of which can be seen in FIG. 24) produced at step SS3 of FIG. 6 using an edge detecting operator to produce transformed data having features that correspond to the profile data's step edges. In this case, the data filterer 155 convolves the stepped profile with a Haar filter having a profile as diagrammatically represented in FIG. 13 to transform the profile data into transformed data having peaks at locations corresponding to the locations of the step edges. FIG. 25 shows an example of transformed data produced by filtering the profile of FIG. 24 with a Haar filter.

At step SS6 of FIG. 21, the controller 159 instructs the data feature finder 156 to determine the locations of the features in the transformed data. The data feature finder 156 uses pattern recognition, for example by segmenting the transformed data using a known segmentation algorithm, in this case a watershed algorithm.

The data feature finder 156 then determines the locations in the profile data that correspond to the determined locations of the features in the transformed data. If the transformed data and the stepped profile share the same x-axis, then the locations of the step edges in the stepped profile are identified as being the same as the determined locations in the transformed data. If instead, the transformed data and the stepped profile have different x-axes, then the data feature finder 156 identifies the transformation required to transform the determined locations into the coordinate system of the profile data. To identify the locations of the step edges in the profile data, the determined locations are then transformed using the identified transformation.

Processing Profile Data to Identify the Height of Steps

To determine the z-direction heights of the steps, at step SS7 of FIG. 21, the step height determiner 160 fits to the profile data step functions at each of the identified step edge locations as described above with reference to step S7 of FIG. 6.

Determining Diffractive Polynomial

Figure 22:
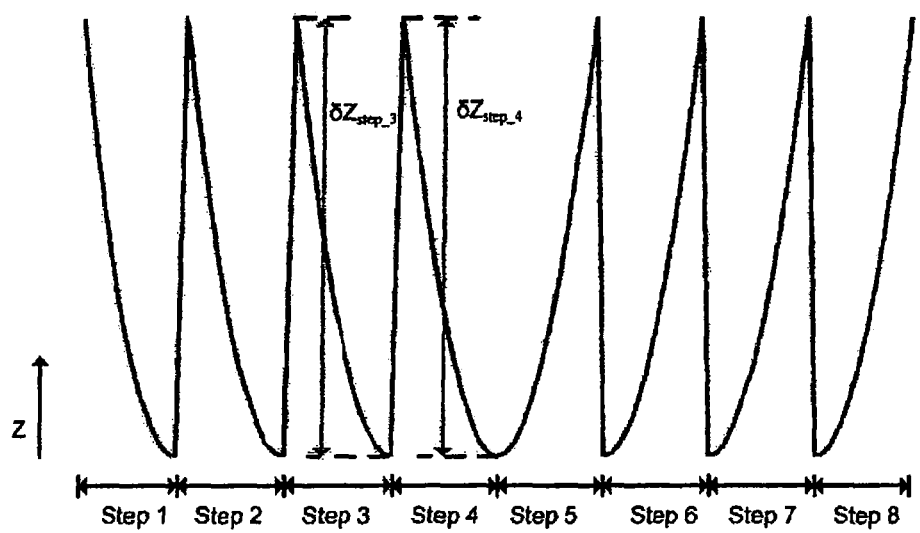
FIG. 22 shows a diagrammatic representation of a diffractive component of an aspheric diffractive structure.

Aspheric diffractive structures are often designed so that their diffractive component has a constant height band—this is shown very diagrammatically in FIG. 22 in which it can be seen that the polynomial and stepped components of the diffractive component of the aspheric diffractive structure have been designed so that, when superposed upon one another, the maximum height change within any given step is constant. For example and with reference to FIG. 22, the maximum z-direction height change within step 3 ($\delta Z_{step\_3}$) is the same as the maximum z-direction height change within step 4 ($\delta Z_{step\_4}$).

The inventor has appreciated that this relationship between the stepped and polynomial components of the diffractive component of the aspheric diffractive structure can be exploited to avoid the requirement for a priori knowledge about the coefficients of the diffractive polynomial.

Figure 23:
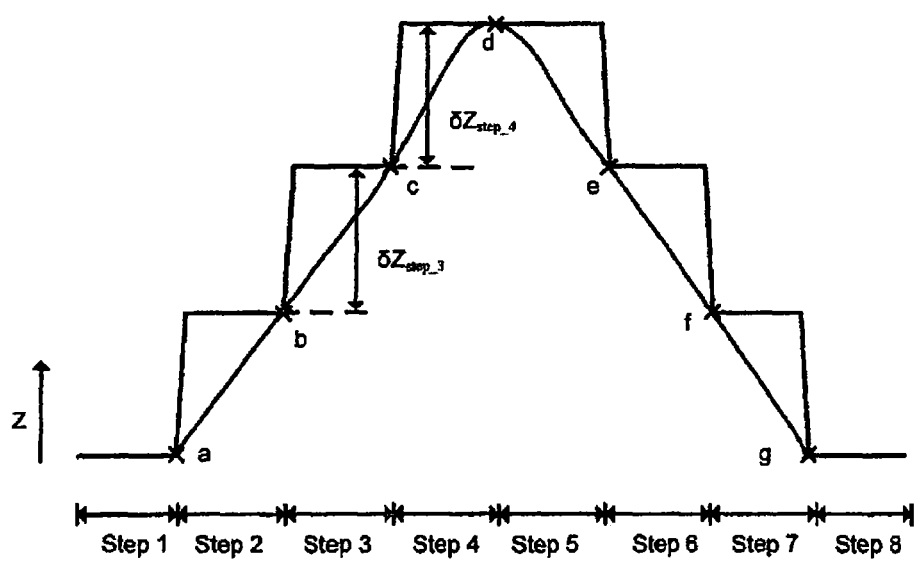
FIG. 23 shows a diagrammatic representation of a stepped component determined from a measurement of an aspheric diffractive structure.
Figure 26:
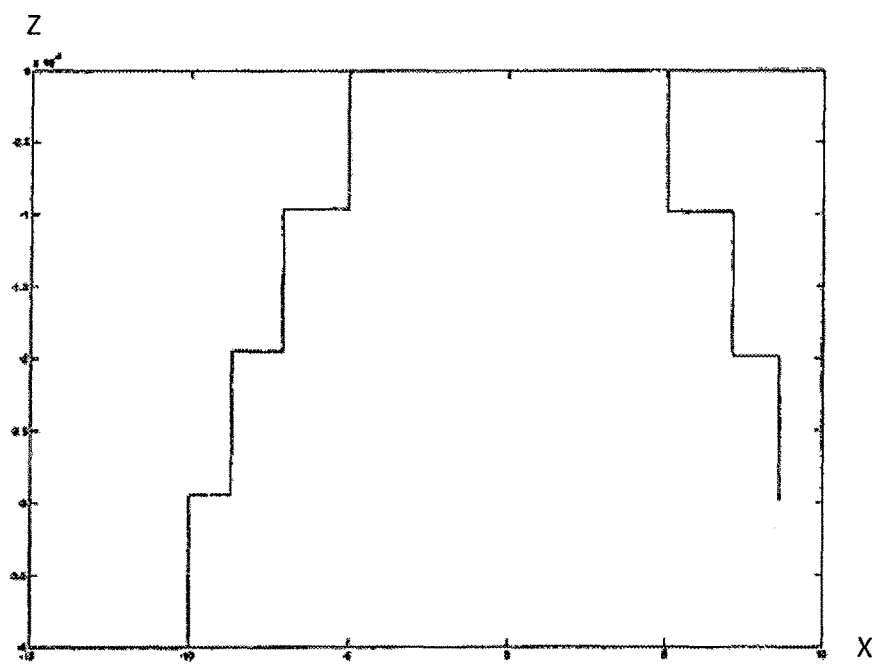
FIG. 26 shows a stepped profile derived from the profiles of FIGS. 24 and 25.

Accordingly, at step SS7 of FIG. 21, the polynomial component identifier 163 uses the step locations and step heights determined at steps SS6 and SS7 of FIG. 21 to produce stepped data representative of the stepped component of the diffractive component of the aspheric diffractive structure—FIG. 23 shows a very diagrammatic representation of such stepped data and FIG. 26 shows a profile having the step locations and heights as determined from the profile of FIG. 24 using steps SS6 and SS7 of FIG. 21. As can be seen from FIG. 23, the z-direction height change of each step of the stepped profile is the same as the maximum z-direction height change of the corresponding step of FIG. 22. For example, the step height of step 4 of the stepped profile of FIG. 23 is $\delta Z_{step\_4}$ which corresponds to the maximum z-direction height change within step 4 ($\delta Z_{step\_4}$) of FIG. 22.

A polynomial, as shown in FIG. 23, of predetermined order is then fitted by the polynomial component identifier 163 to the interior step edges of the stepped data (at points a, b, c, d, e, f, and g) using a known fitting process to determine the polynomial's coefficients. Due to the design relationship between the stepped and polynomial components of the diffractive component of the aspheric diffractive structure, the fitted polynomial corresponds to the diffractive polynomial component, but vertically flipped and offset in the z-direction. As the diffractive polynomial component of an aspheric structure generally has a minimum at z=0, the polynomial component identifier 163 then vertically flips the fitted polynomial and forces its minimum made to coincide with z=0 so as to determine the diffractive polynomial. A person skilled in the art will appreciate that this approach could equally be applied the other way round, with the relationship between the stepped data and the diffractive polynomial being instead determined by vertically flipping the stepped data.

Identifying Aspheric Axis

As the diffractive component of the aspheric diffractive structure is centred about the axis of rotational symmetry of the structure and the measurement path includes this axis, the location of the axis of the aspheric diffractive structure corresponds to the centre of the stepped profile. To determine the centre of the stepped profile, at step SS8 of FIG. 21 the axis identifier 161 identifies the pairs of step edges that correspond to concentric steps on the aspheric diffractive structure. One way of identifying such pairs of step edges is to start at the zero position on the x-axis of the stepped profile and to then look in the positive x-direction for the first identified step edge before, starting at the zero position on the x-axis of the stepped profile, looking in the negative x-direction for the partner to the first identified step edge and repeating this process for the second, third etc. identified step edges; a person skilled in the art will appreciate a number of alternative manners that the pairs of step edges could instead be identified.

For each pair of step edges, the axis identifier 161 then determines the median x-position of the two edges. From the resulting list of median locations, the data feature finder 156 calculates the median of the medians to determine the x-location of the axis of the aspheric diffractive structure.

At this point, the location of the step edges, the step heights, and the axis of symmetry have all been determined thereby characterising the stepped profile and the process may stop. In this embodiment however, the process proceeds as set out below.

Determining Residual Error

Figure 27:
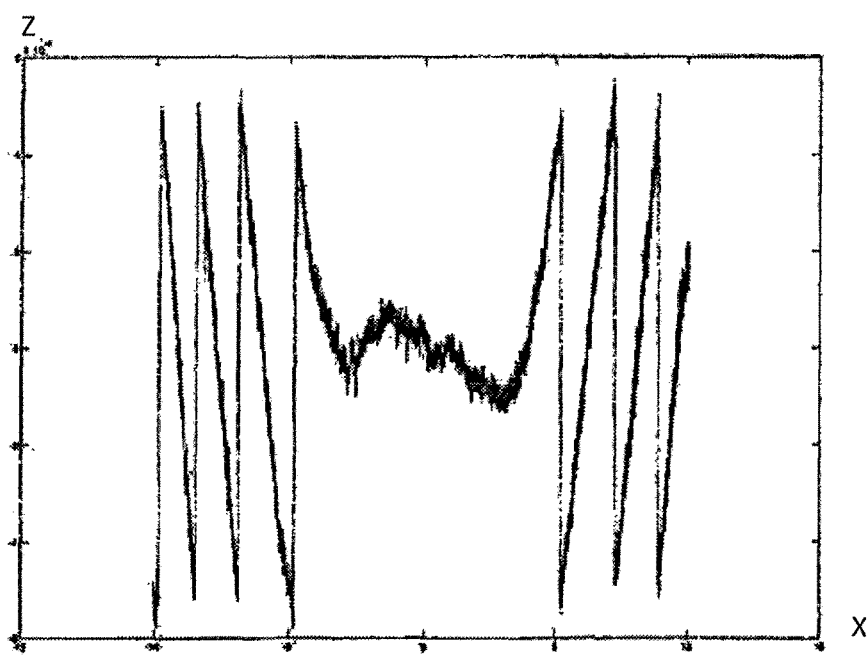
FIG. 27 shows a residual error plot for the stepped profile of FIG. 26.

At step SS9 of FIG. 21 the error calculator 162 creates a profile having steps of the determined height positioned at the identified locations and subtracts this profile from the stepped profile of FIG. 24 to produce a profile of the residual errors as shown in FIG. 27.

Iterative Surface Characterisation

In this embodiment, the location of the step edges and the step heights is iteratively determined as set out below.

After producing a residual error plot, the error calculator 162 calculates an error metric representing the total error contained in the error plot. A person skilled in the art will be aware of a large range of metrics that could be calculated from the data contained in the error plot and used as an error measure, for example, the mean or median error, the RMS (root mean squared) error etc.

At step SS10 of FIG. 21 the data processor 150 checks whether the calculated error metric is below a predetermined threshold. If the error is below the predetermined threshold, then the controller 159 causes the output provider 158 to display via the display 121: the calculated step locations and heights (both averaged values for each step and individual values for each side of the stepped data), the R and k values of the conic component of the aspheric equation, the determined coefficients of the diffractive and aspheric polynomials, the residual error, and the location of the aspheric axis; the process then ends. Otherwise, the process proceeds to step SS11 of FIG. 21 where the data component remover 154 creates a stepped profile having steps of the determined height positioned at the identified locations and superposes upon this profile the determined diffractive polynomial to produce a profile similar to that shown in FIG. 9. The produced profile represents the determined diffractive component of the aspheric diffractive structure. The data component remover 154 then subtracts the produced profile from the preconditioned measurement data to produce a profile that represents only the aspheric components of the aspheric diffractive structure.

At step SS12 of FIG. 21, the data component remover 154 centres the profile that represents only the aspheric components of the aspheric diffractive structure about the z axis using a known affine centring method, and then fits the conic component of the above aspheric equation to the preconditioned measurement data using a known optimisation algorithm. The data component remover 154 then subtracts the fitted conic component from the profile that represents only the aspheric components of the aspheric diffractive structure before using a known optimisation algorithm to fit the polynomial component of the above aspheric equation to the data resulting from the subtraction of the conic component from the profile that represents only the aspheric components of the aspheric diffractive structure.

Figure 28:
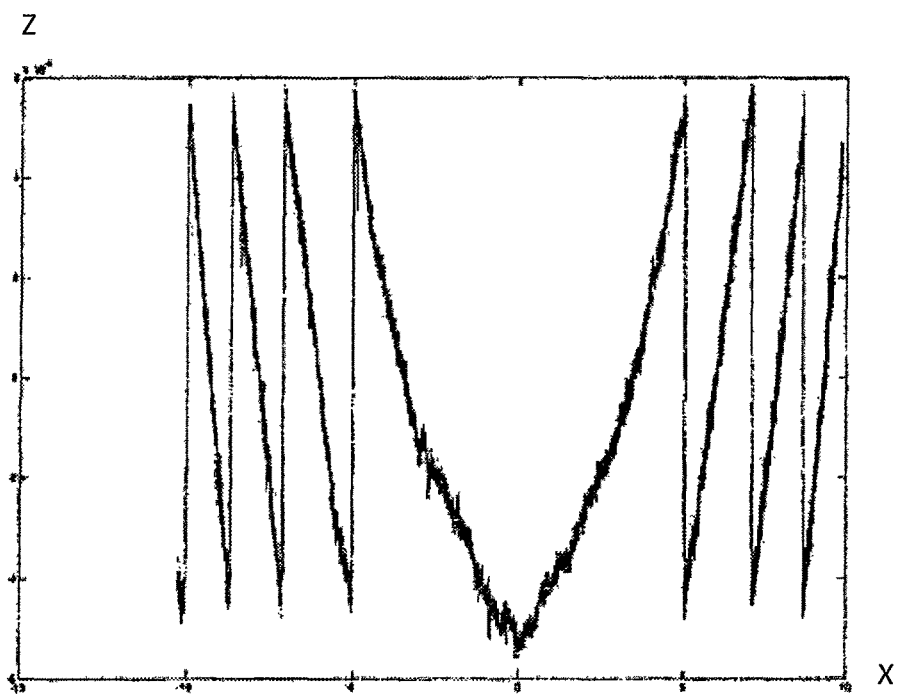
FIG. 28 shows a profile of the diffractive and stepped components of an aspheric diffractive surface for a second iteration of the process shown in FIG. 21.

At step SS13 of FIG. 21 the data component remover 154 subtracts the fitted conic and aspheric and diffractive polynomial components from the preconditioned measurement data to produce profile data that represents the non-aspheric components of the workpiece 14. FIG. 28 shows such a profile following processing of the profile of FIG. 24 according to steps SS4 to SS12 of FIG. 21.

Figure 29:
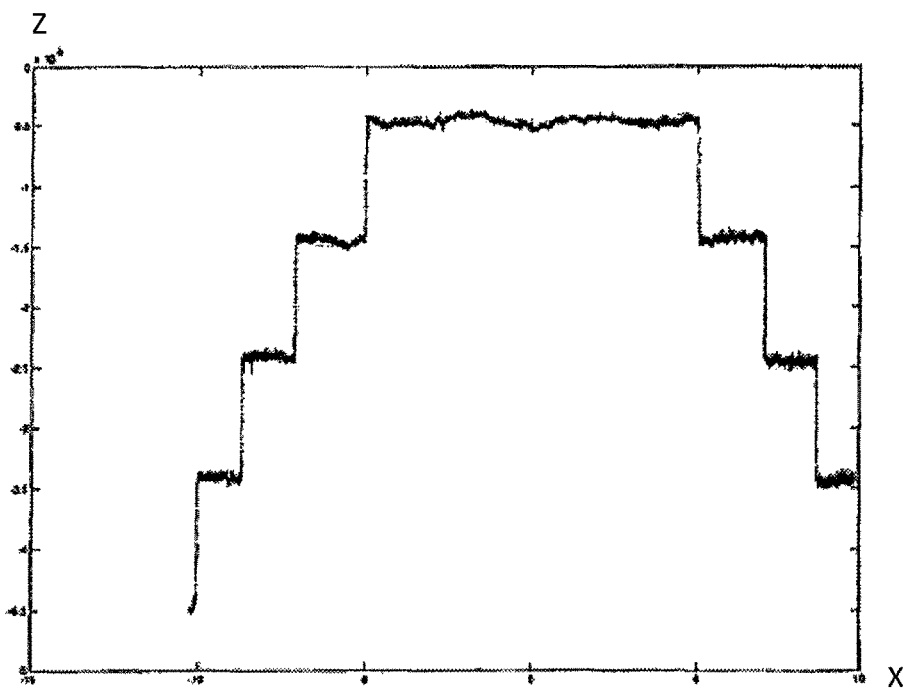
FIG. 29 shows a profile of the stepped component of an aspheric diffractive surface for a second iteration of the process shown in FIG. 21.

At step SS14 of FIG. 21 the data component remover 154 subtracts the determined diffractive polynomial components from the profile data produced at step SS13 of FIG. 21 to produce profile data that represents the stepped diffractive component of the workpiece 14. FIG. 29 shows such a profile produced from the profile of FIG. 28. This step is not used during the first iteration because, as the polynomial component of the diffractive component of the aspheric diffractive surface is not known a priori, no estimate of the coefficients of the diffractive polynomial is available for the first iteration. Accordingly, for the first iteration, the diffractive polynomial component is assumed to be zero; a person skilled in the art will appreciate that, for the purposes of the first iteration, other assumptions of the value of the diffractive polynomial could equally be employed.

Figure 30:
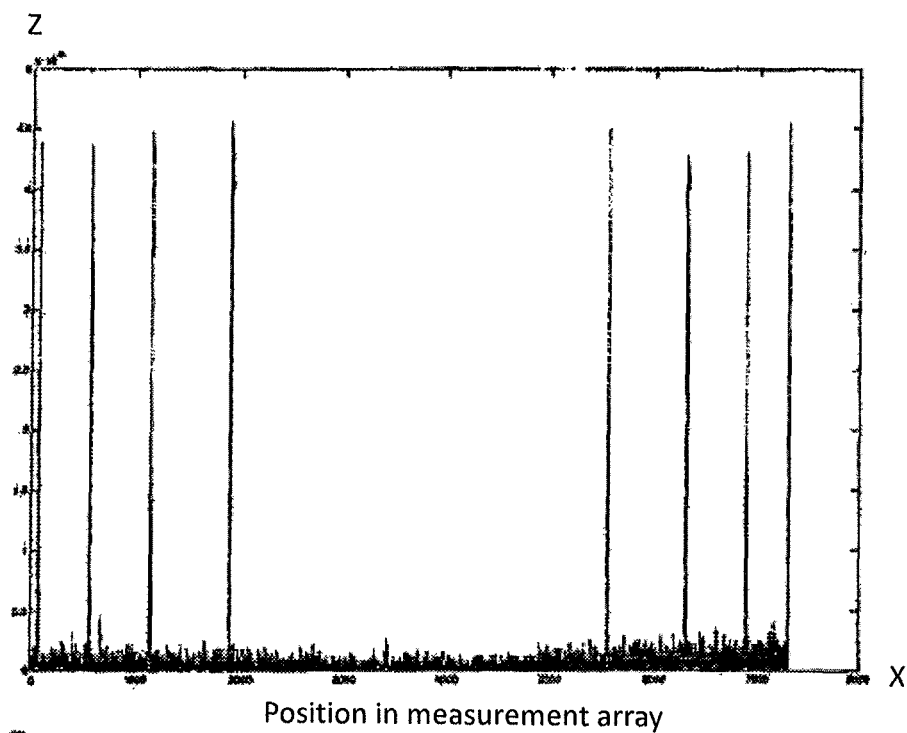
FIGS. 30, 31, and 32 show profiles corresponding respectively to those of FIGS. 25, 26, and 27 as produced by a second iteration of the process shown in FIG. 21.
Figure 31:
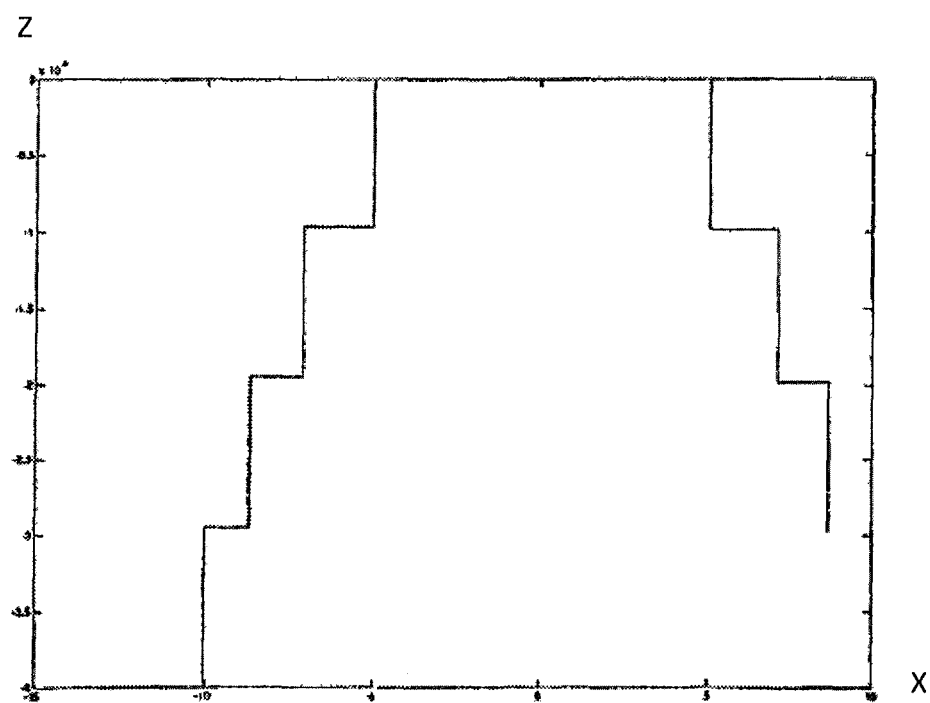
Figure 32:
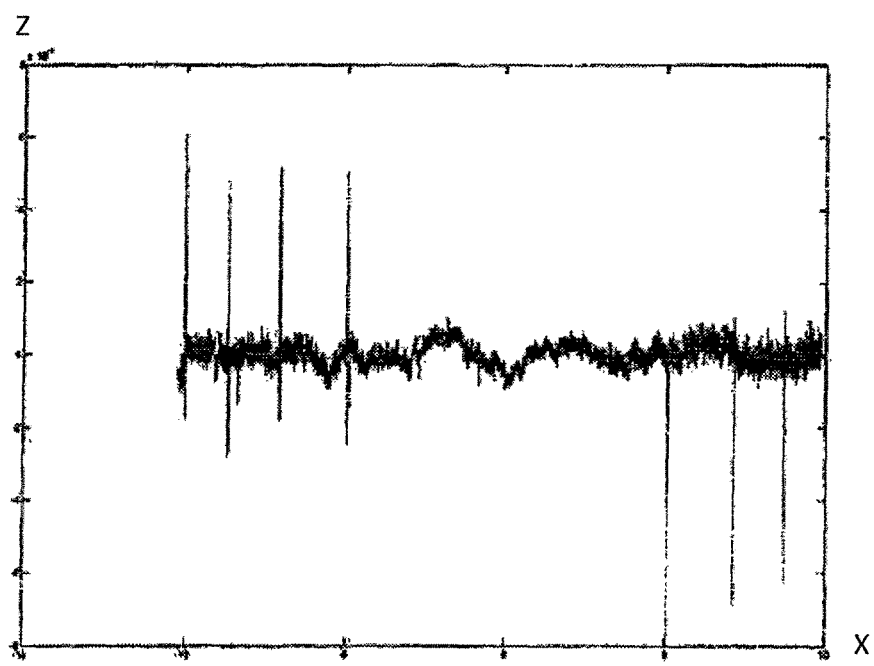

The process then returns to step SS4 of FIG. 21 and iterates until the determined residual error is below the predetermined threshold and the process ends at step SS10 of FIG. 6. When determining the residual error for subsequent iterations, instead of creating a stepped profile and comparing it with the profile of FIG. 29 as produced at step SS14 of FIG. 21, a profile is created that represents the combination of the stepped profile and the determined diffractive polynomial, this profile is then subtracted from the profile produced at step SS13 of FIG. 21 so that the determined error takes into account the determined diffractive polynomial. FIGS. 30, 31, and 32 show profiles corresponding respectively to those of FIGS. 25, 26, and 27 as produced by a second iteration of the process of FIG. 21.

Modifications and Variations

A person skilled in the art will appreciate that the methods and apparatus described herein need not be limited in their application to instruments for the measurement of aspheric, concave or convex surfaces, and may equally be applied to instruments for the measurement of other surfaces. In particular, a person skilled in the art will appreciate that, although the above description has described the characterisation of the surface of an aspheric diffractive lens, the techniques described herein could equally be applied to the characterisation of any surface having a series of stepped edges, for example the characterisation of the surfaces of Micro Electro-Mechanical Systems (MEMS), or the characterisation of the pins on a microchip.

A person skilled in the art will appreciate that, although the above description of the present invention has been described with reference to a mechanical stylus for measurement of a surface profile, other types of measurement probe, for example non-contact probes such as the laser triangulation probe supplied by Taylor Hobson in the Talysurf CLI product, may equally be employed. U.S. Pat. No.

7,518,733, the whole contents of which are hereby incorporated by reference, describes an example white light measurement probe as may be used with the present invention.

A person skilled in the art will appreciate that although the above description of the present invention has been described with reference to a surface form and measuring surface measurement instrument, the same approach could also be applied to a roundness measuring machine, for example the Talyrond (Registered Trademark) series 130, 131, 385, 395, or 450 machines of Taylor Hobson Limited, a division of Ametek Inc., or to a coordinate measurement machine (CMM).

A person skilled in the art will appreciate that although the above description of the present invention has been described with reference to a computer having a processor and associated data and program instruction/software storage means, as another possibility, the functionality described herein could equally be achieved via one or more hard-wired circuits such as one or more application-specific integrated circuits (ASICs) or via one or more digital signal processors (DSPs).

A person skilled in the art will appreciate that, although the fitting of the aspheric equation to the measurement data has been described above as a two stage process with the conic component of the aspheric equation being fitted to the measurement data before fitting the polynomial component of the aspheric equation, the fitting process could equally be performed using a single stage fitting process.

As one possibility, instead of using an optimisation algorithm at S3 of FIG. 6 to fit the polynomial component of the aspheric equation to the data resulting from the subtraction of the conic component from the preconditioned measurement data, parameters describing the polynomial component of the aspheric equation may be provided by the user. In such a case, the data component remover 154 would then subtract the polynomial component described by the provided parameters from the data resulting from the subtraction of the conic component from the preconditioned measurement data to produce profile data representing the non-aspheric components of the workpiece 14.

A person skilled in the art will appreciate that, although the above-described embodiment employed a Haar filter to identify the locations of the edges of the steps in the stepped profile, other edge detecting operators could instead be employed, for example the stepped profile could be convolved with Gaussian derivative operator having the form:

$$g(x) = \frac{x}{2\pi\sigma} e^{\frac{-x^2}{2\sigma^2}}$$

where $\sigma$ is the standard deviation of the Gaussian. A person skilled in the art will recognise that other derivative-based edge detecting filters could instead be employed as the edge detecting operator, for example wavelet difference filters.

A person skilled in the art will appreciate that, although in the above-described embodiment the data feature finder employs a watershed algorithm, other pattern analysis or segmentation algorithms, for example thresholding, region growing, level sets, or neural networks, could be employed to determine the locations of the features in the transformed data.

A person skilled in the art will appreciate that, instead of determining windows in the stepped profile over which to fit step functions, these windows may be predetermined, for example so as be 100 μm in the x-direction away from the identified location of the step edge.

As one possibility, because an error plot may contain large spikes (as seen, for example, in FIG. 32) due to errors in the determination of the step edge locations, when calculating an error metric from the data contained in an error plot, the error data may first be windowed to remove the spikes.

As another possibility, instead of calculating a residual error and deciding based on the residual error whether to stop iterating, the above described process could instead be performed by iterating a predetermined number of times.

As another possibility, instead of or as well as using a known affine centring method at step S12 of FIG. 6 to centre upon the z-axis the profile that represents the aspheric components of the aspheric diffractive lens, the transformation required to make the location of the aspheric axis as determined at step S6 of FIG. 6 coincide with the z-axis may be calculated and used to centre upon the z-axis the profile that represents the aspheric components of the aspheric diffractive lens.

Although method 2 above has been described with reference to aspheric diffractive structures having diffractive components with a constant height band, a person skilled in the art will appreciate that the techniques described herein could equally be applied to diffractive structures having diffractive components that are do not have a constant height band.

As one possibility, there is provided a computer program, computer program product, computer readable medium, or signal, comprising computer program instructions to cause a programmable computer to carry out any one or more of the methods described herein.

A person skilled in the art will appreciate that, in addition to the characterisation of aspheric diffractive surfaces, the techniques described herein could equally be applied to diffractive surfaces having an underlying form that is not aspheric, and/or to an aspheric surface having a stepped structure that is not diffractive.

Various features described above may have advantages with or without other features described above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method of measuring a characteristic of a surface of an aspheric diffractive structure, the method comprising:
   causing a metrological apparatus that includes a measurement probe to perform a measurement operation comprising controlling the measurement probe to contact the surface of the aspheric diffractive structure and to move along a measurement path across the surface of the aspheric diffractive structure the surface having one or more steps,
      wherein the characteristic of the surface comprises at least one of:
         (i) a step height of the one or more steps; and
         (ii) a location of at least one step edge of the one or more steps;

receiving measurement data representing results of the measurement operation and indicating a profile of the aspheric diffractive structure;

fitting by a processor an equation having an aspheric component to the received data;

producing by the processor fitted data based upon the fitted equation;

subtracting by the processor the fitted data from the received data to produce first subtracted data;

subtracting by the processor data representing a polynomial component of a diffractive component of the aspheric diffractive structure from the first subtracted data to produce second subtracted data with a profile having one or more steps corresponding to the surface; and processing the second subtracted data to determine at least one of:
(i) a location of at least one step edge of one of the one or more steps on the surface of the aspheric diffractive structure; and
(ii) at least one step height of one of the one or more steps on the surface of the aspheric diffractive structure; and providing output indicating the determination; wherein the aspheric diffractive structure is one of a lens or a lens mold.

2. The method of claim 1, wherein the identification of the location comprises using an edge detection operator to identify the edges of the steps.

3. The method of claim 2, wherein the identification of the step edge locations comprises convolving the second subtracted data with a filter.

4. The method of claim 3, further comprising segmenting the filtered data.

5. The method of claim 1, wherein the identification of step heights comprises fitting a step function to the second subtraction data.

6. The method of claim 1, wherein the second subtracted data comprises a centre and the method further comprises determining the centre of the second subtraction data by:
calculating average positions between two or more pairs of step edge locations; and
calculating an average of the calculated average positions.

7. The method of claim 1, wherein step of processing the second subtracted data identifies a plurality of step edge locations and corresponding step heights,
the method further comprising fitting a function to points at the identified heights and locations to determine data representing one or more components of the surface using the fitted function and the identified step edges and locations to produce fitted stepped data;
subtracting the fitted stepped data from the received data to produce further subtracted data; and
fitting the equation having an aspheric component to the further subtracted data to produce fitted aspheric information.

8. The method of claim 7 comprising subtracting the fitted stepped data and the aspheric information from the measurement data produce profile data that represents the non-aspheric components of the workpiece.

9. The method of claim 8 comprising the processor iteratively repeating the fitting and subtracting steps until a determined residual error is below a predetermined threshold.

10. Apparatus including a measurement probe and a processor, the processor being configured to:
cause the measurement probe to perform a measurement operation comprising contacting a surface of an aspheric diffractive structure and moving along a measurement path across the surface of the aspheric diffractive structure for characterising the surface of the aspheric diffractive structure
receive measurement data representing a surface profile of the aspheric diffractive structure, wherein the surface profile is a result of a measurement operation performed by the measurement probe on the surface of the aspheric diffractive structure, the surface having one or more steps;
fit an equation having an aspheric component to the measurement data;
produce fitted data based upon the fitted equation;
subtract the fitted data from the measurement data to produce first subtracted data;
subtract data representing a polynomial component of a diffractive component of the aspheric diffractive structure from the first subtracted data to produce second subtracted data with a profile having one or more steps corresponding to the surface; and
process the second subtracted data to perform a determination of at least one of:
(i) a location of at least one step edge of a step on the surface of the aspheric diffractive structure; and
(ii) at least one step height of a step on the surface of the aspheric diffractive structure; and
provide output indicating the determination.

11. A data processor configured to measure a characteristic of a surface by processing data provided by metrological apparatus having a measurement probe including a stylus tip controlled to contact a surface of a diffractive aspheric workpiece having an aspheric and a diffractive component and to move along a measurement path across the surface of the workpiece for characterising the diffractive aspheric workpiece, the data processor comprising:
a data receiver configured to receive measurement data produced from a measurement operation using the measurement probe;
a data component remover configured to fit an equation representing the aspheric component to the measurement data to produce fitted data and to subtract the fitted data from the measurement data to produce subtracted data having a series of steps; and
a data feature finder configured to produce transformed data from the subtracted data having features on the surface of the diffractive aspheric workpiece at locations in the transformed data that correspond to one or more locations in the subtracted data of the steps, and to identify one or more locations of the features taking into account a polynomial component of the diffractive component of the surface of the diffractive aspheric workpiece, whereby edges of the steps characterise a stepped component of the diffractive component of the surface of the diffractive aspheric workpiece, thereby to perform a determination of at least one of:
(i) a location of at least one step edge of a step on the surface of the aspheric diffractive structure; and
(ii) at least one step height of a step on the surface of the aspheric diffractive structure; and
wherein the data feature finder is further configured to provide output indicating the determination.

12. The data processor of claim 11, wherein the data component remover is further configured to subtract the diffractive polynomial component from the measurement data when the diffractive polynomial component is known.

13. The data processor of claim 11, comprising:
a step height determiner configured to determine, for each of one or more determined locations, a height of a step having a step edge at one of the determined locations; and,
a polynomial component identifier configured to produce stepped data based on one or more determined step locations and step heights and to fit a polynomial to the stepped data to determine a diffractive polynomial component.

14. The data processor of claim 13, wherein the data component remover is further configured to subtract the diffractive polynomial component determined by the polynomial component identifier.

15. The data processor of claim 11, wherein data processor further comprises:
a data storer configured to store the measurement data received by the data receiver;
a data preconditioner configured to filter the measurement data to remove noise and unwanted variations therefrom;
a data filterer configured to filter the subtracted data received from the data component remover to find features to be identified by the data feature finder;
a step height determiner configured to determine, for each of a plurality of determined locations; a height of a step having a step edge at one of the plurality of determined locations;
an axis identifier configured to identify an axis of rotational symmetry of the aspheric diffractive workpiece; and
an error calculator configured to calculate a residual error of at least one of the determined locations, step heights and aspheric axis;
an output provider configured to output at least one of the determined locations, step heights and aspheric axis to a data display device; and
a user input receiver configured to receive a user input.

16. The data processor of claim 15, further comprising an edge detector configured to convolve the subtracted data with a Haar filter.

17. The data processor of claim 11, further comprising an edge detector configured to apply an edge detecting operator to the subtracted data.

18. The data processor of claim 11, further comprising an edge detector configured to convolve the subtracted data with a filter.

19. The data processor of claim 11, wherein the features are local maxima or minima.

20. The data processor of claim 11, further comprising an edge detector configured to perform a thresholding operation on the transformed data.

21. The data processor of claim 11, wherein the apparatus is configured to determine, for at least one of the determined locations, a height of the step having a step edge at the at least one determined location.

22. The data processor of claim 21, comprising a step height determiner configured to determine, for each of the determined locations, the height of a step having a step edge at one of the determined locations, and wherein the apparatus is further configured to fit a function to points at the determined heights and locations to determine data representing one or more components of the surface.

23. The data processor of claim 22, wherein the data representing one or more components of the surface includes a diffractive polynomial component.

24. The data processor of claim 22, wherein the step height determiner is configured to fit one or more step functions to the subtracted data.

25. The data processor of claim 24, wherein the apparatus is configured to fit the step function to the subtracted data over a plurality of subsets of the subtracted data and is:

$$z = A + Bx + \delta$$

where A and B are constants and $\delta$ has a first constant value for a first one of the plurality of subsets occurring before the step edge and a second, different, constant value for a second one of the plurality of subsets occurring after the step edge; and
where z corresponds to a displacement of the stylus tip as the stylus tip moves along the measurement path, x corresponds to the displacement along the measurement path and h corresponds to the step height.

26. The data processor of claim 25, wherein the step height determiner is configured to identify locations in the subtracted data of one or more windows within which the features lie.

27. The data processor of claim 26, wherein the step height determiner is configured to identify locations of valleys or peaks on either side of each feature.

28. The data processor of claim 26, wherein the step height determiner is configured to determine locations in the subtracted data that correspond to the locations of the one or more windows within which the features lie.

29. The data processor of claim 26, wherein the step height determiner is configured to identify at least one of the first and second ones of the plurality of subsets based upon the locations of the windows within which the features lie.

30. The data processor of claim 26, comprising an error calculator configured to:
create reconstructed data having a series of steps the locations of the step edges and the heights of the steps correspond to the determined locations of the step edges and the determined heights; and,
compare the reconstructed data and the measurement data to determine any differences therebetween.

31. The data processor of claim 11, comprising an axis identifier configured to determine a centre of the subtracted data based upon one or more pairs of the determined locations.

32. The data processor of claim 11, wherein the axis identifier is further configured to determine a centre of the subtracted data by:
calculating average positions between two or more pairs of determined locations; and
calculating an average of the calculated average positions.

33. The data processor of claim 11, wherein the data receiver comprises one or more memory elements of a computing device.

34. The data processor of claim 11, wherein the data component remover is further configured to determine data representing one or more further components of the surface by fitting a function to the measurement data.

35. The data processor of claim 34, wherein the data representing one or more components of the surface includes an aspheric component.

36. A non-transitory storage medium carrying computer readable instructions for causing a processor to execute the steps of:
receiving measurement data representing results of a measurement operation performed using a metrological apparatus that includes a measurement probe controlled to contact the surface of the aspheric diffractive structure and to move along a measurement path across the surface of the aspheric diffractive structure, the measurement operation having been performed on the surface of the aspheric diffractive structure, the surface having one or more steps, wherein the aspheric diffractive structure is a lens;

fitting an equation having an aspheric component to the received data;

producing fitted data based upon the fitted equation;

subtracting the fitted data from the received data to produce first subtracted data;

subtracting data representing a polynomial component of a diffractive component of the aspheric diffractive structure from the first subtracted data to produce second subtracted data having one or more steps;

identifying at least one of:
  (i) at least one step edge location; and
  (ii) a step height in the second subtracted data; and determining, based on the at least one step edge location or step height, how well the lens conforms to a design specification.

37. A metrological apparatus for characterising the surface of an aspheric diffractive structure, the apparatus including a measurement probe controlled to contact a surface of an aspheric diffractive structure and to move along a measurement path across the surface of the aspheric diffractive structure, the apparatus further having a processor configured to:

control the measurement probe for performing a measurement operation on the surface of an aspheric diffractive structure;

receive measurement data from the measurement probe, the measurement data representing the results of a measurement operation performed by the measurement probe on the surface of the aspheric diffractive structure;

fit an equation having an aspheric component to the received data;

produce fitted data based upon the fitted equation;

subtract the fitted data from the received data to produce first subtracted data;

subtract data representing a polynomial component of a diffractive component of the aspheric diffractive structure from the first subtracted data to produce second subtracted data having one or more steps; and process the second subtracted data to provide a determination of a location of at least one of:
  (i) at least one step edge of a step on the surface of the aspheric diffractive structure; and
  (ii) at least one step height of a step on the surface of the aspheric diffractive structure; and provide output indicating the determination of the location or the step height.

* * * * *